United States Patent
Ida et al.

(10) Patent No.: US 10,627,646 B2
(45) Date of Patent: Apr. 21, 2020

(54) IMAGE PICKUP OPTICAL SYSTEM AND IMAGE PICKUP APPARATUS

(71) Applicant: CANON KABUSHIKI KAISHA, Tokyo (JP)

(72) Inventors: Yoshiaki Ida, Utsunomiya (JP); Kazuhiko Momoki, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 15/156,784

(22) Filed: May 17, 2016

(65) Prior Publication Data

US 2016/0341973 A1 Nov. 24, 2016

(30) Foreign Application Priority Data

May 20, 2015 (JP) .................................. 2015-102380
May 12, 2016 (JP) .................................. 2016-095927

(51) Int. Cl.
*G02B 27/58* (2006.01)
*G02B 5/22* (2006.01)
*G03B 11/00* (2006.01)

(52) U.S. Cl.
CPC ............... *G02B 27/58* (2013.01); *G02B 5/22* (2013.01); *G03B 11/00* (2013.01)

(58) Field of Classification Search
CPC . G02B 5/22; G02B 5/20; G02B 5/205; G02B 7/006; G02B 27/58; G02B 5/005;
(Continued)

(56) References Cited

U.S. PATENT DOCUMENTS 6,449,081 B1 * 9/2002 Onuki .................. G02B 26/005 345/48
6,545,828 B2 * 4/2003 Buczek .................. G02B 5/005 252/586
(Continued)

FOREIGN PATENT DOCUMENTS

DE 102005042496 A1 3/2007
JP 09-236740 A 9/1997
(Continued)

OTHER PUBLICATIONS

Notice of Reasons for Refusal for Rejection issued by the Japanese Patent Office dated Mar. 10, 2020 in corresponding Japanese Patent Application No. 2016-095927, with English translation.

*Primary Examiner* — Jade R Chwasz
(74) *Attorney, Agent, or Firm* — Carter, DeLuca & Farrell LLP

(57) ABSTRACT

An image pickup optical system includes an aperture stop, a first apodization filter disposed on an object side of the aperture stop, and a second apodization filter disposed on an image plane side of the aperture stop, each of the first apodization filter and the second apodization filter satisfies a predetermined condition, and a meridional light beam of a maximum angle of view has an optical path not involving at least one of a point of intersection between the optical axis and the first apodization filter and a point of intersection between the optical axis and the second apodization filter when an aperture size of the aperture stop is maximum.

17 Claims, 18 Drawing Sheets

(58) Field of Classification Search
CPC .. G02F 1/133514; G03F 7/0007; G03B 11/00
USPC ................................ 359/888, 885, 890, 892
See application file for complete search history.

(56) References Cited

U.S. PATENT DOCUMENTS

| | | | |
|---|---|---|---|
| 8,953,249 B2* | 2/2015 | Inomoto | G02B 3/00 |
| | | | 359/642 |
| 9,052,495 B2 | 6/2015 | Ida | |
| 2011/0211267 A1* | 9/2011 | Takato | A61B 1/00188 |
| | | | 359/784 |
| 2013/0215489 A1 | 8/2013 | Blackburn et al. | |
| 2015/0015966 A1 | 1/2015 | Ida | |

FOREIGN PATENT DOCUMENTS

| | | |
|---|---|---|
| JP | H10268382 A | 10/1998 |
| JP | 11-231195 A | 8/1999 |
| JP | 2012128151 A | 7/2012 |
| WO | 2016038935 A1 | 3/2016 |
| WO | 2016039147 A1 | 3/2016 |

\* cited by examiner

IMAGE PICKUP OPTICAL SYSTEM AND IMAGE PICKUP APPARATUS

BACKGROUND OF THE INVENTION

Field of the Invention

The present invention relates to an image pickup optical system configured to control a light quantity of an image pickup light beam.

Description of the Related Art

In general, an image pickup optical system is required to form such a blurred image (defocus image) that a light quantity smoothly distributes from the center to the periphery and does not concentrate on the contour of the blurred image. A view of the blurred image changes depending on a distance from the optical system to each of a focused object and an object located outside a depth of field and the aberration of the image pickup optical system. It is difficult to form a desired blur image in all capturing areas.

Japanese Patent Laid-Open Nos. ("JPs") 09-236740 and 11-231195 each disclose an optical system including an apodization filter. In JPs 09-236740 and 11-231195, the apodization filter is a transmittance distribution filter in which a transmitting light quantity decreases as a distance from an optical axis increases in a direction perpendicular to the optical axis. This apodization filter can provide a light intensity distribution in an image pickup light beam and form a desired defocus image (blurred image).

In general, the transmittance distribution given to the light beam by the apodization filter may be symmetrical with respect to the optical axis or the center. JPs 09-236740 and 11-231195 dispose the apodization filter near the aperture stop so as to provide a light beam of each angle of view with a transmittance distribution having a high central symmetry.

However, the effect reduces in the optical systems in JPs 09-236740 and 11-231195 due to vignetting. The vignetting means a light shield of part of a light beam. It is difficult to completely eliminate the vignetting so as to improve the imaging performance of the image pickup optical system and to make the image pickup optical system small and light. However, a passing area of the on-axis light beam in the aperture stop does not accord with that of the off-axis light beam when the image pickup optical system has vignetting. Therefore, the obtained effect is different according to the angle of view. In general, the off-axis light beam passes a narrower region in the aperture stop than that of the on-axis light beam. A transmittance distribution that is made to fit the on-axis light beam cannot provide a proper effect to the off-axis light beam.

SUMMARY OF THE INVENTION

The present invention provides an image pickup optical system and an image pickup apparatus, which can form a good defocus image with light beams of all angles of view even when the image pickup optical system has vignetting.

An image pickup optical system according to one aspect of the present invention includes an aperture stop, a first apodization filter disposed on an object side of the aperture stop, and a second apodization filter disposed on an image plane side of the aperture stop. Each of the first apodization filter and the second apodization filter satisfies the following conditional expression:

$$T(r1) \geq T(r2)$$

where r1 and r2 (r1<r2) are distances from an optical axis in a radial direction orthogonal to the optical axis, T(r1) and T(r2) are transmittances at positions apart from the optical axis by the distances of r1 and r2, and a meridional light beam of a maximum angle of view has an optical path not involving at least one of a point of intersection between the optical axis and the first apodization filter and a point of intersection between the optical axis and the second apodization filter when an aperture size of the aperture stop is maximum.

Further features of the present invention will become apparent from the following description of exemplary embodiments with reference to the attached drawings.

DESCRIPTION OF THE EMBODIMENTS

Figure 1:
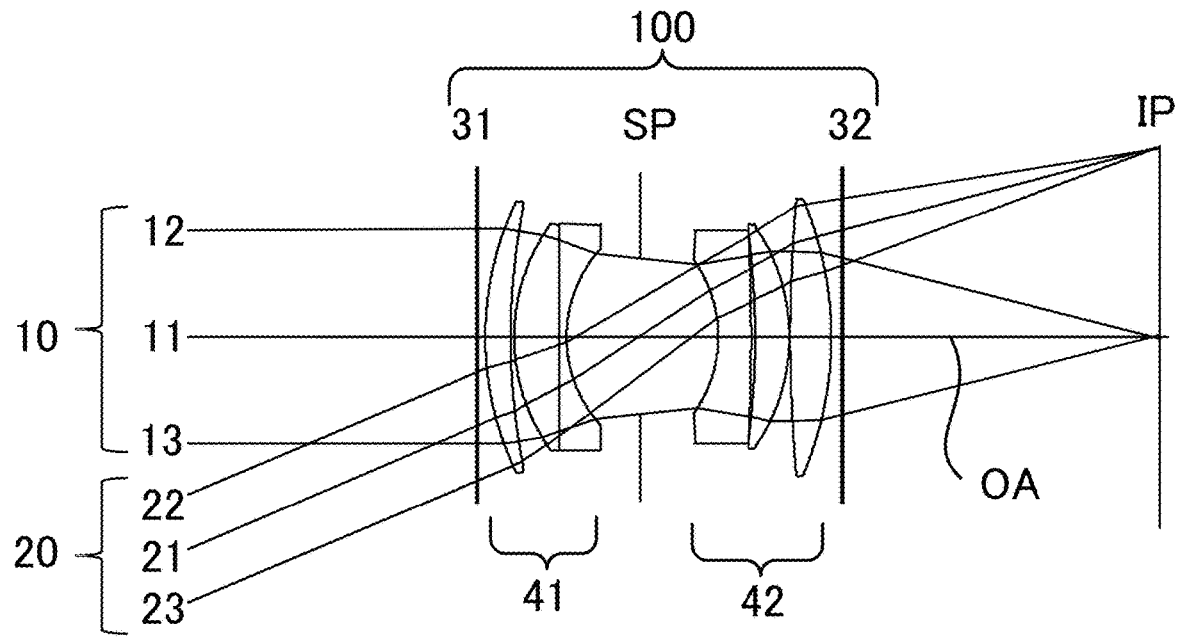
FIG. 1 is a sectional view of an image pickup optical system according to this embodiment.

A detailed description will now be given of an embodiment of the present invention with reference to the accompanying drawings.

The image pickup optical system according to this embodiment can control a blur image (defocus image) in capturing a three-dimensional object, and includes a plurality of lenses (optical elements) and an aperture stop. The image pickup optical system includes at least one transmittance distribution filter (apodization filter) at both sides of the aperture stop. The three-dimensional object is an object including a plurality of parts having different object distances, and particularly means an object having a point apart from the focal plane of the image pickup optical system in image pickup by a distance longer than a depth of field. Then, a defocus image (blurred image) is formed on an imaging or image plane.

A blurred image becomes wider as the distance longer than the depth of field of the part from the focal plane increases, and it is thus necessary to properly form the blurred image. More specifically, when a diameter of the blurred image is longer than about 1 to 2% of a radius of an image circle of the image pickup optical system, the blurred image can be recognized. The image circle is a circle in which light passing the effective diameter of the image pickup optical system forms an image. The imaging plane corresponds to an image pickup plane of a solid-state image sensor (photoelectric conversion element), such as a CCD sensor and a CMOS sensor, for receiving an optical image, for the image pickup optical system in a video camera, a digital camera, etc. The imaging plane corresponds to a film plane when an image pickup lens for film-based camera is used. The radius of the image circle may be a maximum image height on the image pickup plane or a film plane in the image pickup apparatus.

This embodiment controls a blurred image by providing a transmittance distribution to a light beam of each angle of view using a transmittance distribution filter, and by forming a light quantity distribution of the blurred image which is different from that without using the transmittance distribution filter. A blurred image having a large light quantity in its outer circumference (periphery) is not desired because the contour looks conspicuous. Therefore, the transmittance in the periphery of the blurred image may be lower than that at the center.

One conventional method for improving a blurred image is to use an image pickup optical system in which a transmittance distribution filter is disposed near an aperture stop. Light passing areas in the transmittance distribution filter of light beams of respective angles of view may be accorded with one another by disposing a transmittance distribution filter near the aperture stop, and an effective apodization effect can be obtained. However, in general, the image pickup optical system exhibits vignetting for the off-axis light beam, and the off-axis light beam does not pass the periphery of the aperture stop. As a consequence, when the transmittance distribution filter is disposed near the aperture stop, the effective apodization effect cannot be obtained. Accordingly, the image pickup optical system of this embodiment includes a plurality of lenses, an aperture stop, and at least one transmittance distribution filter both sides of the aperture stop. This configuration can provide the effective apodization effect even for the off-axis light beam.

Referring now to FIG. 1, a description will be given of passing regions of the on-axis light beam and the off-axis light beam in the image pickup optical system (image pickup lens). FIG. 1 is a sectional view of an image pickup optical system 100 according to this embodiment. The image pickup optical system 100 includes an aperture stop (diaphragm) SP, a (front) lens unit 41 (first optical element) disposed on an object side of the aperture stop SP, and a (rear) lens unit 42 (second optical element) disposed on an object IP plane side of the aperture stop SP. The transmittance distribution filters (apodization filter) are disposed on sections 31 and 32 in the image pickup optical system 100.

An off-axis light beam 10 and an off-axis light beam 20 (the most off-axis light beam) pass at different heights from the optical axis OA at a position distant from the aperture stop SP. The off-axis light beam 20 is a light beam that forms an image outside the optical axis, and FIG. 1 representatively illustrates a light beam that enters and passes the image pickup optical system 100 from the lower side under the optical axis OA. The conventional transmittance distribution filter is disposed near the aperture stop so as to dispose the transmittance distribution filter at an overlapping position of the light beams of respective angles of view. When the transmittance distribution filter is disposed apart from the aperture stop, the off-axis light passes the position apart from the optical axis and is subject to the asymmetrical transmittance distribution. The following description premises that the transmittance distribution of the transmittance distribution filter is centrally symmetrical (symmetrical to the optical axis OA), and the transmittance is smaller in the periphery than that in the center part.

When the off-axis light beam 20 passes the transmittance distribution filter, the transmittance becomes lower as the distance from the optical axis OA is longer. When the transmittance distribution filter is disposed on the section 31 in front of the aperture stop SP or on the object side of the aperture stop SP, the transmittance of the ray 12 is equal to that of the ray 13 in the on-axis light beam 10. For the off-axis light beam 20, the transmittance of the ray 22 is highest, and the transmittance becomes lower as the position approaches to the ray 23. When the transmittance distribution filter is disposed on the section 32 behind the aperture stop SP or on the image plane IP side of the aperture stop SP, the transmittance of the ray 12 is equal to that of the ray 13 in the on-axis light beam 10, similar to the transmittance filter disposed on the section 31. The transmittance of the ray 23 is highest and the transmittance becomes lower as the position approaches to the ray 22 in the off-axis light beam 20. This is the reason why the transmittance of the off-axis light beam 20 is asymmetrical with respect to the optical axis OA.

This embodiment utilizes that a relationship between the transmittance of the ray 22 and the transmittance of the ray 23 in the off-axis light beam 20 becomes inverted before and after the aperture stop SP. This embodiment disposes at least one transmittance distribution filter before and after the aperture stop SP, for example, at the sections 31 and 32, and makes the transmittance distribution of the off-axis light beam 20 (pupil transmittance distribution) closer to the equivalently central asymmetry. A passing position of the on-axis light beam 10 is different from that of the off-axis light beam 20 at a position apart from the aperture stop SP. Thus, the pupil transmittance distribution of the on-axis light beam 10 and that of the off-axis light beam 20 can be independently determined by changing the arrangement of the transmittance distribution filters and their transmittance distributions.

The image pickup optical system 100 according to this embodiment can control a blurred image in capturing a three-dimensional object, and includes a plurality of optical elements including the (front) lens unit 41 and the (rear) lens unit 42, and the aperture stop SP. The image pickup optical system 100 includes at least one transmittance distribution filter (apodization filter) on both sides of the aperture stop SP or on the object and image sides of the aperture stop SP. The image pickup optical system 100 includes a first apodization filter disposed on the object side of the aperture stop SP and a second apodization filter disposed on the image IP side of the aperture stop SP. Each of the first and second apodization filters has a predetermined transmittance distribution so as to change a light quantity distribution in a blurred image (defocus image) of the (three-dimensional) objector or so as to control the blurred image.

The respective transmittance distribution filters, such as both of the first and second apodization filters, in this embodiment satisfy the following conditional expression (1).

$$T(r1) \geq T(r2)(r1 < r2) \tag{1}$$

In the conditional expression (1), T(r1) and T(r2) are transmittances at positions apart from the center of each transmittance distribution filter (optical axis OA) by distances r1 and r2 (r1<r2) in a radial direction (orthogonal to the optical axis OA). In other words, each transmittance distribution filter has a transmittance distribution so that the transmittance is lower as the distance from the optical axis OA increases. Each transmittance distribution filter may contain a transmittance distribution that does not satisfy the conditional expression (1) in its partial area, as long as the conditional expression (1) is entirely and substantially satisfied.

In this embodiment, a blurred image (defocus image) does not mean an image blurred by a hand shake and object shake, but a (defocus) image formed on the image plane IP by an object point distant from a focal plane of the image pickup optical system 100 by a distance longer than a depth of field. A blurred image can be controlled in capturing a three-dimensional object, by disposing at least one transmittance distribution filter (apodization filter) before and after the aperture stop SP, and by forming a transmittance distribution having a high symmetry.

In this embodiment, the transmittance distribution filter (apodization filter) has a predetermined transmittance on a transparent glass plate and a lens surface, and is made by evaporating a light absorption material and a reflective material or by applying a photosensitive material and by exposing it so as to maintain a predetermined density. A concave lens made of a light absorption material (ND glass), and a flat plate having a light absorption distribution may be used. A transmittance distribution is variable using an electrochromic material, etc.

The conditional expression (1) relates to a transmittance distribution of a transmittance distribution filter. In order to improve an edge emphasized blur having a large light amount in the periphery or an area distant from the optical axis OA, it is necessary to make lower a pupil transmittance in the periphery of a light beam than in the central area of a light beam (area near the optical axis OA). When the conditional expression (1) is not satisfied, a light quantity in the periphery of the light beam is larger than that in the center part of the light beam, causing an annoying blur having an emphasized edge. The transmittance may be made constant in a predetermined range. Since the transmittance is prevented from reducing in a predetermined range from the center (optical axis OA), a light quantity to be taken in the image pickup optical system 100 can be increased. For example, the transmittance may be changed stepwise when it is difficult to produce a smoothly changing transmittance distribution in a transmittance distribution filter made of an electrochromic material.

In this embodiment, the conditional expression (1) may be satisfied on one section that passes the optical axis OA. If necessary, the conditional expression (1) may be satisfied in all areas or symmetrical areas with respect to the optical axis OA or so that the transmittance distribution is centrally symmetrical. Due to manufacturing scattering, a point having the highest transmittance may shift from the optical axis OA or the transmittance distribution may become uneven. In this case, an error of the transmittance may fall within 5 to 10%.

In this embodiment, the transmittance of at least one transmittance distribution filter (first or second apodization filter) may satisfy the following conditional expression (2).

$$T1/T0 \leq 0.5 \tag{2}$$

In the conditional expression (2), T0 is a maximum transmittance within an effective diameter of a transmittance distribution filter (first or second apodization filter), and T1 is a minimum transmittance within the effective diameter. The conditional expression (2) relates to a transmittance distribution of a transmittance distribution filter. When the value exceeds the upper limit in the conditional expression (2), it is difficult to decrease a light quantity in the periphery so as to improve the edge emphasized blur.

In this embodiment, the following conditional expression (3) may be satisfied where e is a distance on the optical axis between two transmittance distribution filters, and L is a distance from a surface vertex of a lens surface closest to the object of the image pickup optical system 100 to an imaging plane (paraxial imaging plane).

$$e/L > 0.1 \tag{3}$$

The conditional expression (3) relates to a distance between the two transmittance distribution filters arranged in the image pickup optical system 100. When a value is lower than a lower limit value of the conditional expression (3), the distance between the two transmittance distribution filters reduces and it is difficult to independently determine the pupil transmittance distributions of the on-axis light beam 10 and the off-axis light beam 20. It is difficult to properly set the pupil transmittance distributions of the on-axis light beam 10 and the off-axis light beam 20. The conditional expression (3) may satisfy the following conditional expression (3a).

$$e/L > 0.2 \tag{3a}$$

In the conditional expressions (3) and (3a), when three or more transmittance distribution filters are arranged in the image pickup optical system, the distance e is a distance between the two transmittance distribution filters that are most separated among a plurality of transmittance distribution filters.

When the aperture stop SP is fully opened, Hb (a foot of the perpendicular line) is a nodal point between the optical axis OA and a perpendicular line (to the optical axis OA) that passes a nodal point between the uppermost ray of the most off-axis light beam and the uppermost ray of the on-axis light beam. Similarly, Hf (a foot of the perpendicular line) is a nodal point between the optical axis OA and a perpendicular line (to the optical axis OA) that passes a nodal point between the lowermost ray of the most off-axis light beam and the lowermost ray of the on-axis light beam. In addition, dj (j=1, 2) is a distance on the optical axis between one of the first apodization filter and the second apodization filter and the aperture stop SP. Dj (j=1, 2) is a distance on the optical axis between the aperture stop SP and one of Hf and Hb closer to the one of the first and second apodization filters. The j-th transmittance distribution filter (first and second apodization filters) may satisfy the following conditional expression (4).

$$-0.2<(dj-Dj)/L<0.3 (j=1,2) \quad (4)$$

Figure 2:
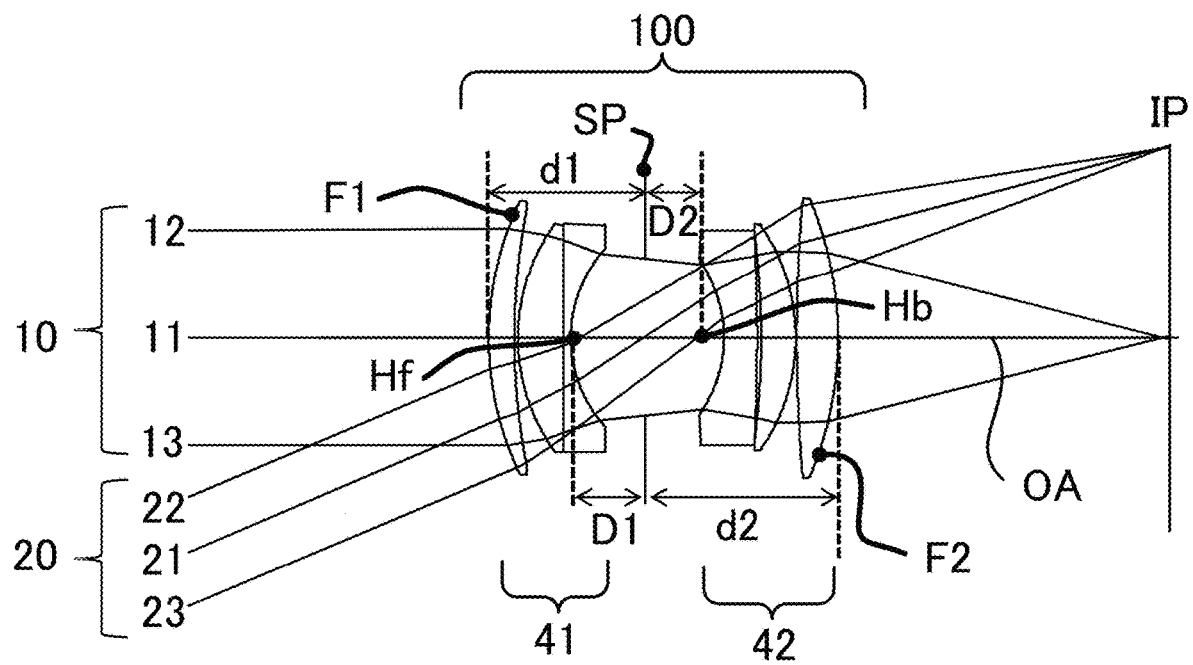
FIG. 2 is a view for explaining a conditional expression (4) according to this embodiment.

FIG. 2 is an explanatory view of the conditional expression (4). The transmittance distribution filters F1 and F2 are arranged in the image pickup optical system 100 according to this embodiment. The transmittance distribution filter F1 is a first (j=1) transmittance distribution filter (first apodization filter) disposed on the object side or front side of the aperture stop SP. The transmittance distribution filter F2 is a second (j=2) transmittance distribution filter (second apodization filter) disposed on the image plane IP side or rear side of the aperture stop SP.

The uppermost ray of the on-axis light beam and the uppermost ray of the most off-axis light beam correspond to the rays 12 and 22 in FIG. 2, and are the uppermost rays among the light beams in the ray diagram. The lowermost ray of the on-axis light beam and the lowermost ray of the most off-axis light beam correspond to the rays 13 and 23 in FIG. 2, and are the lowermost rays among the light beams in the ray diagram. The most off-axis light beam is a light beam having an angle of view on the image plane IP (image pickup plane) which forms an image at the most distant point from the optical axis OA. The point Hb is the foot of the perpendicular line from the nodal point between the rays 12 and 22 to the optical axis OA. The point Hf is the foot of the perpendicular line from the nodal point between the rays 13 and 23 to the optical axis OA. In this embodiment, the first transmittance distribution filter F1 is formed on the first lens surface closest to the object, and the second transmittance distribution filter F2 is formed on the final lens surface closest to the image plane IP.

The conditional expression (4) relates to an arrangement of the transmittance distribution filters F1 and F2. When the value is lower than the lower limit in the conditional expression (4), the transmittance distribution filters F1 and F2 become excessively close to the aperture stop SP and it is difficult to independently determine the pupil transmittance distributions of the on-axis light beam 10 and the off-axis light beam 20. When the value exceeds the upper limit in the conditional expression (4), the light beams of respective angles of view are excessively separated at the positions of the transmittance distribution filters F1 and F2 and it is difficult to provide proper pupil transmittance distributions to all light beams. The conditional expression (4) may satisfy the following conditional expression (4a).

$$-0.1<(dj-Dj)/L<0.2 \quad (4a)$$

In focusing on infinity, the following conditional expression (5) may be satisfied, where f (mm) is a focal length of the image pickup optical system 100, Fno is a minimum F-number.

$$10\ mm \leq f/Fno \leq 75\ mm \quad (5)$$

The conditional expression (5) relates to an entrance pupil diameter of the image pickup optical system 100. When the value is lower than the lower limit in the conditional expression (5), the area of each blurred image on the image plane IP (image pickup plane) becomes excessively narrow. Since the transmittance distribution provided to the blurred image on the image pickup plane becomes excessively small, a blurred-image improving effect of the transmittance distribution filter reduces. Since the blur is small and an annoying blur is unlikely to pose a problem in image pickup. When the value exceeds the upper limit in the conditional expression (5), the blurred image becomes large and the area of each blurred image on the image pickup plane becomes excessively large. The transmittance distribution provided to the blurred image is excessively large, and the blurred-image improving effect of the transmittance distribution filter reduces. The edge emphasized blurred image is caused by the aberration of the aberration of the image pickup optical system. However, in the blurred image having the value that exceeds the upper limit in the conditional expression (5), the influence of the blurred image on the light quantity distribution aberration reduces and the annoying blur is less likely to cause a problem in image pickup. The conditional expression (5) may satisfy the conditional expression (5a).

$$12\ mm \leq f/Fno \leq 70\ mm \quad (5a)$$

In this embodiment, the focal length f (mm) of the image pickup optical system 100 may satisfy the following conditional expression (6).

$$10\ mm \leq f \leq 140\ mm \quad (6)$$

The conditional expression (6) relates to a focal length f of the image pickup optical system. When the value is lower than the lower limit value in the conditional expression (6), the area of each blurred image on the image pickup plane is excessively narrow. The transmittance distribution provided to the blurred image is excessively small on the image pickup plane, and the blurred-image improving effect reduces of the transmittance distribution filter reduces. Since the blur is small, the annoying blur is less likely to pose a problem in image pickup. When the value exceeds the upper limit in the conditional expression (6), the blurred image is excessively large and the area of each blurred image on the image pickup plane is excessively large. Since the transmittance distribution provided to a blurred image is excessively large, the blurred-image improving effect of the transmittance distribution filter reduces. The formed edge emphasized blurred image corresponds to the aberration of the image pickup optical system 100. In the image pickup optical system in which the value exceeds the upper value of the conditional expression (6), the aberration that deteriorates the light quantity distribution of the blurred image can be restrained in the design. Hence, the annoying blur is less likely to occur, and the effect of the transmittance distribution filter reduces. When the upper limit in the conditional expression (6) is satisfied, a light source and an object are likely to have a small dotted shape or thin line shape due to the background compression effect by the perspective of the image pickup optical system 100. In this object, a contour of the blurred image is likely to stand out and the transmittance distribution filter is more effective.

A transmittance difference may be 20% or smaller in the wavelength range from 430 nm to 700 nm at the same position in at least one transmittance distribution filter (at least one of the first and second apodization filters) in this embodiment. This condition relates a wavelength dispersion of the transmittance. When this condition is not satisfied, the periphery of the blurred image is colored and the blurred-image improving effect reduces.

In this embodiment, the conditional expression (7) is satisfied, where rmax is an effective diameter of at least one transmittance distribution filter (at least one of the first and second apodization filters), and r is a distance from the optical axis OA in the radius direction.

$$\min(0.9, \max(0, -1.6r+1)) \leq T(r/r\max) \leq \min(1, -5r+5.5) \quad (7)$$

In the conditional expression (7), min(A, B) is a smaller one of A and B, and max(A, B) is a larger one of A and B.

The conditional expression (7) relates to a transmittance distribution of the transmittance distribution filter. When the value is lower than the lower limit in the conditional expression (7), the transmittance is low and the light quantity taken in the image pickup optical system 100 becomes small. The exposure time period in image pickup becomes long and the hand shake and the object shake are likely to occur. All transmittance distribution filters are designed to satisfy the conditional expression (7).

The following conditional expression (8) may be satisfied in a range of r<0.8*rmax, where r0*rmax is a diameter with which a transmittance is $T0/\sqrt{e}$ in at least one transmittance distribution filter (at least one of the first and second apodization filters).

$$0.8*\exp(-(\tfrac{1}{2})*(r/(0.8*r0))^2) \leq T(r/r\max) \leq 1.2*\exp(-(\tfrac{1}{2})*(r/(1.2*r0))^2) \quad (8)$$

The conditional expression (8) relates to a transmittance distribution of the transmittance distribution filter. When the conditional expression (8) is satisfied, the transmittance distribution is close to the Gaussian distribution. In general, the transmittance distribution filter may have a Gaussian distribution type transmittance distribution. When the transmittance distribution is disposed on the object side of the aperture stop SP, the transmittance distribution on the lowermost ray side can be made close to the Gaussian distribution. When the transmittance distribution is disposed on the image side (image plane IP side) of the aperture stop SP, the transmittance distribution on the uppermost ray side can be close to the Gaussian distribution.

At least one transmittance distribution filter that satisfies the conditional expression (8) may be disposed before and after the aperture stop SP. Then, a combination of the transmittance distribution filters arranged before and after the aperture stop SP can make the pupil transmittance distribution of the light beam of each angle of view close to the Gaussian distribution. When each of the transmittance distribution filters arranged before and after the aperture stop SP does not have a transmittance distribution of a Gaussian distribution, the pupil transmittance distribution of the off-axis light beam 20 obtained by the combination does not become symmetrical with respect to the center (optical axis OA), even when the transmittance distribution of each transmittance distribution filter is centrally symmetrical. When the transmittance distribution filters arranged before and after the aperture stop SP are designed so as to satisfy the conditional expression (8), the pupil transmittance distribution close to the symmetry with respect to the center can be provided for a light beam of every angle of view.

In this embodiment, the transmittance of the uppermost ray of the maximum view angle light beam in one of the two transmittance distribution filters (first and second apodization filters) may be higher than that of the lowermost ray, and the transmittance of the lowermost ray of the maximum view angle light beam in the other of the two transmittance filters (first and second apodization filters) may be higher than that of the uppermost ray, when the aperture size of the aperture stop is maximum. The maximum view angle light beam is a light beam that forms an image in the most off-axis area in the image circle. In the image pickup apparatus, it may be a light beam that forms an image at the maximum image height on the image plane IP, such as an image pickup plane or film plane. This condition relates to a relationship between the transmittance distribution filter and the light beam that passes the transmittance distribution filter. When this condition is not satisfied, the transmittance distribution provided by the two transmittance distribution filters to the maximum view angle light beam is more asymmetrical and the transmittance of only one of the uppermost ray and the lowermost ray reduces. When this condition is satisfied, the transmittance distribution provided to the maximum view angle light beam by the two transmittance distribution filters is less likely to be asymmetrical and a pupil transmittance distribution is likely to be symmetrical with respect to the center.

In this embodiment, in one of the two transmittance filters (first and second apodization filters), the transmittance of the uppermost ray of the meridional light beam of a maximum angle of view may be a maximum transmittance and the transmittance of the lowermost ray of the meridional light beam may be a minimum transmittance, when an aperture size of the aperture stop SP is maximum. In addition, in the other of the two transmittance filters, the transmittance of the lowermost ray of the meridional light beam of the maximum angle of view may be a maximum transmittance and the transmittance of the uppermost ray of the meridional light beam may be a minimum transmittance, when the aperture size of the aperture stop SP is maximum. This condition relates to a relationship between the transmittance distribution filter and the light beam that passes the transmittance distribution filter. This condition means that the meridional light beam does not pass the point on the optical axis on the transmittance distribution filter. When this condition is not satisfied, the transmittance distribution provided by the two transmittance distribution filters to the maximum view angle light beam is likely to be more asymmetrical and the transmittance of only one of the uppermost ray and the lowermost ray reduces. When this condition is satisfied, the transmittance distribution provided to the maximum view angle light beam by the two transmittance distribution filters is less likely to be asymmetrical and a pupil transmittance distribution is likely to be symmetrical with respect to the center. When this condition is satisfied, the transmittance distribution filter can be disposed at a position where the on-axis light beam and the off-axis light beam are separated from each other, and the pupil transmittance distributions of the on-axis light beam and the off-axis light beam can be independently and more easily controlled.

In this embodiment, it is preferred that the meridional light beam of the maximum angle of view has an optical path not involving at least one of a point of intersection between the optical axis and the first apodization filter (one of the two transmittance distribution filter) and a point of intersection between the optical axis and the second apodization filter (the other of the two transmittance distribution filter) when the aperture size of the aperture stop is maximum. When the meridional light beam of the maximum angle of view has an optical path not involving any one of the point of the intersection between the optical axis and the first apodization filter and the point of the intersection between the optical axis and the second apodization filter, the asymmetry of the transmittance distribution which is given by the two transmittance distribution filters to the light beam having the maximum angle of view is weakened. Accordingly, a pupil transmittance distribution with high central asymmetry can be obtained. In addition, the transmittance distribution filters can be disposed at positions where the on-axis light beam and the off-axis light beam are separated from each other, and accordingly it is easy to control the pupil transmittance distributions of the on-axis light beam and the off-axis light beam independently.

When degrees of vignetting with respect to the off-axis light beam significantly vary depending on positions in front of and behind the aperture stop SP, the asymmetry of the blurred image is enhanced. In this case, the meridional light beam of the maximum angle of view may have an optical path not involving one of the points of the two transmittance distribution filters on the optical axis. As a result, the asymmetry can be improved by controlling the blurred image of the off-axis light beam while the influence of the on-axis light beam on the blurred image is suppressed.

When the aperture stop SP is fully opened, y is an image height of the image pickup optical system 100 and Ymax is a maximum image height, a peripheral light quantity ratio R at the image height y=0.9 Ymax may satisfy the following conditional expression (9). Herein, the peripheral light quantity ratio R is a light quantity ratio of a light quantity of the off-axis light beam to a light quantity of the on-axis light beam, which considers vignetting but does not consider the transmittances of the first and second apodization filters.

$$R \leq 0.5 \qquad (9)$$

The conditional expression (9) relates to peripheral dimming in the image pickup optical system 100. When the conditional expression (9) is satisfied, vignetting is large and more clearly separates the on-axis light beam from the off-axis light beam. Then, the transmittance distribution filter can be disposed at a position where the on-axis light beam is separated from the off-axis light beam, and the pupil transmittance distributions of the on-axis light beam and the off-axis light beam can be independently and more easily controlled.

First Embodiment

Figure 3:
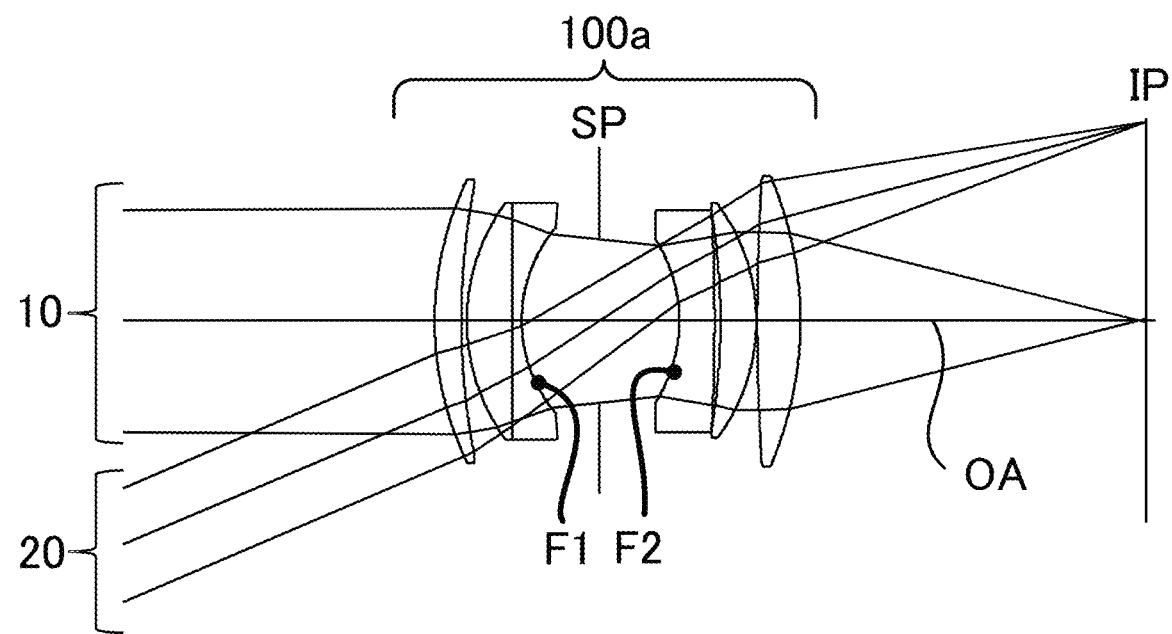
FIG. 3 is a sectional view of an image pickup optical system according to a first embodiment.

Referring now to FIGS. 3 to 6B, a description will be given of an image pickup optical system according to a first embodiment of the present invention. FIG. 3 is a sectional view of an image pickup optical system 100a according to this embodiment. An image pickup optical system 100a includes a (front) lens (unit) 41 (first optical element), a (rear) lens (unit) 42 (second optical element), and an aperture stop SP. In the image pickup optical system 100a, a transmittance distribution filter F1 (first apodization filter) is disposed on a fifth surface on the object side of the aperture stop SP and lens surface closest to the aperture stop SP. In the image pickup optical system 100a, a transmittance distribution filter F2 (second apodization filter) is disposed on a seventh surface on the image plane IP side of the aperture stop SP and lens surface closest to the aperture stop SP. The transmittance distribution filters F1 and F2 provide pupil transmittance distributions to light beams of all angles of view from the on-axis light beam 10 to the off-axis light beam 20 (most off-axis light beam), improving the blurred image.

Figure 4:
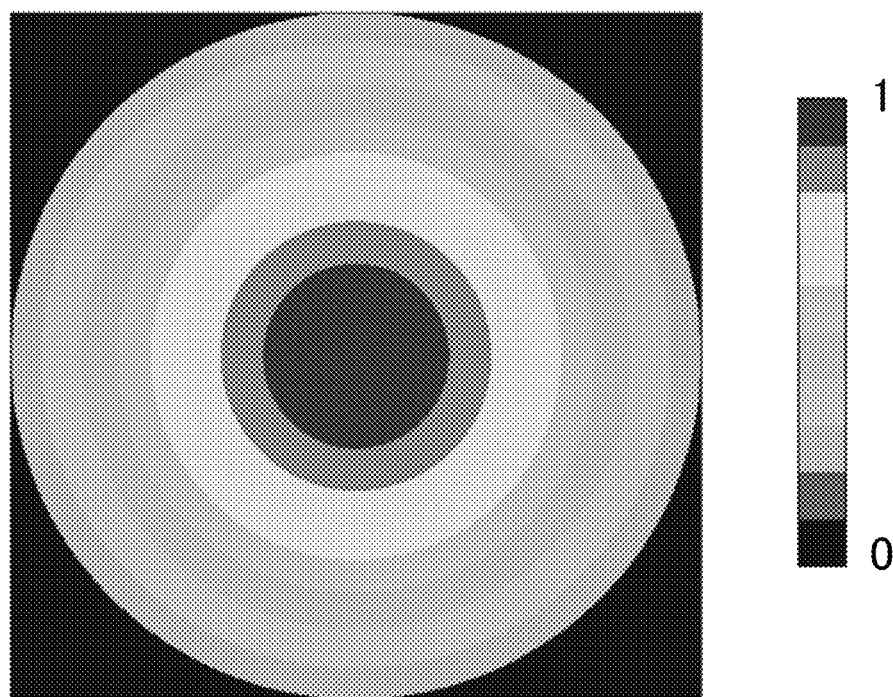
FIG. 4 is a view illustrating a transmittance distribution of a transmittance distribution filter according to the first embodiment.
Figure 5A:
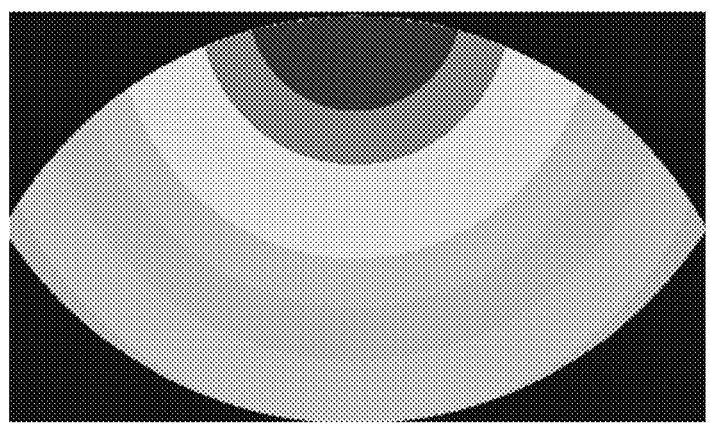
FIGS. 5A and 5B are views illustrating transmittance distributions which the transmittance distribution filter according to the first embodiment provides to the off-axis light beam.
Figure 5A:
Figure 5B:
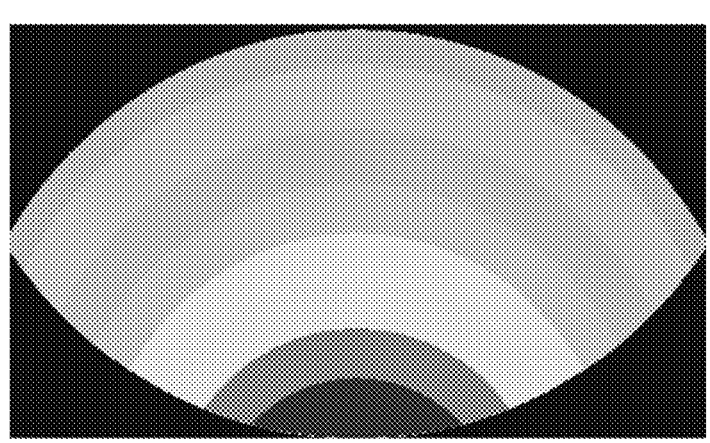
Figure 5B:
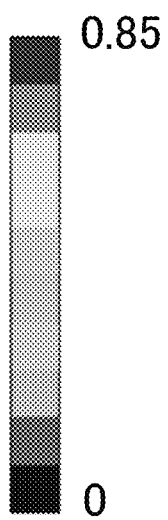
Figure 6A:
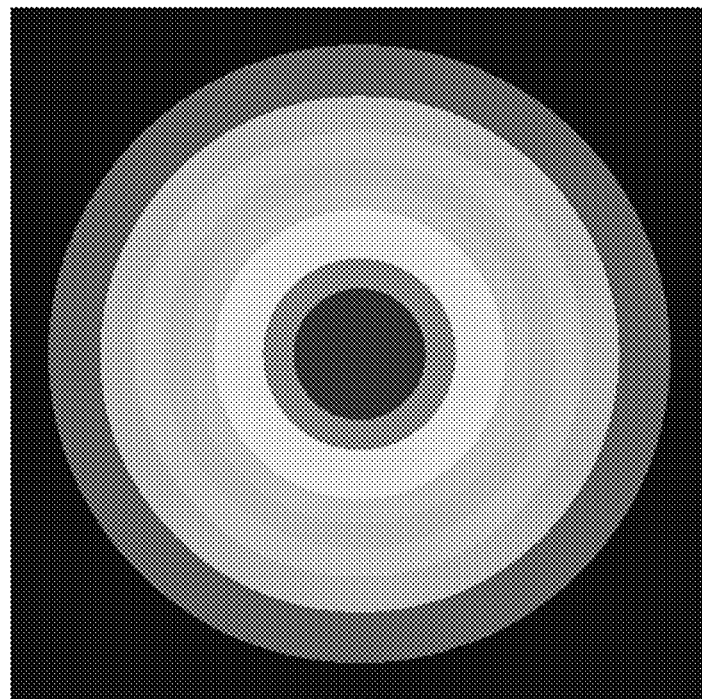
FIGS. 6A and 6B are views illustrating pupil transmittance distributions of an on-axis light beam and an off-axis light beam according to the first embodiment.
Figure 6B:
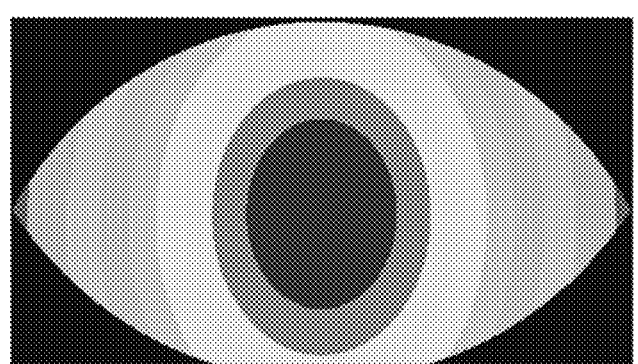

FIG. 4 is a view illustrating the transmittance distributions of the transmittance distribution filters F1 and F2. The outer circumference in FIG. 4 represents an effective diameter of each transmittance distribution filter. The effective diameter of the transmittance distribution filter is a maximum diameter of a light passing area from the optical axis OA. FIGS. 5A and 5B are views illustrating the pupil transmittance distributions provided to the off-axis light beam 20 by the transmittance distribution filters F1 and F2. As understood from FIGS. 5A and 5B, the pupil transmittance distribution provided to the off-axis light 20 by each of the transmittance distribution filters F1 and F2 is less symmetrical. FIGS. 6A and 6B are views illustrating the pupil transmittance distributions provided to the on-axis light beam 10 and the off-axis light beam 20 by a combination of the transmittance distribution filters F1 and F2. As understood from FIGS. 6A and 6B, a pupil transmittance distribution is highly symmetrical not only for the on-axis light beam 10 (FIG. 6A) but also for the off-axis light beam 20 (FIG. 6B).

Second Embodiment

Figure 7:
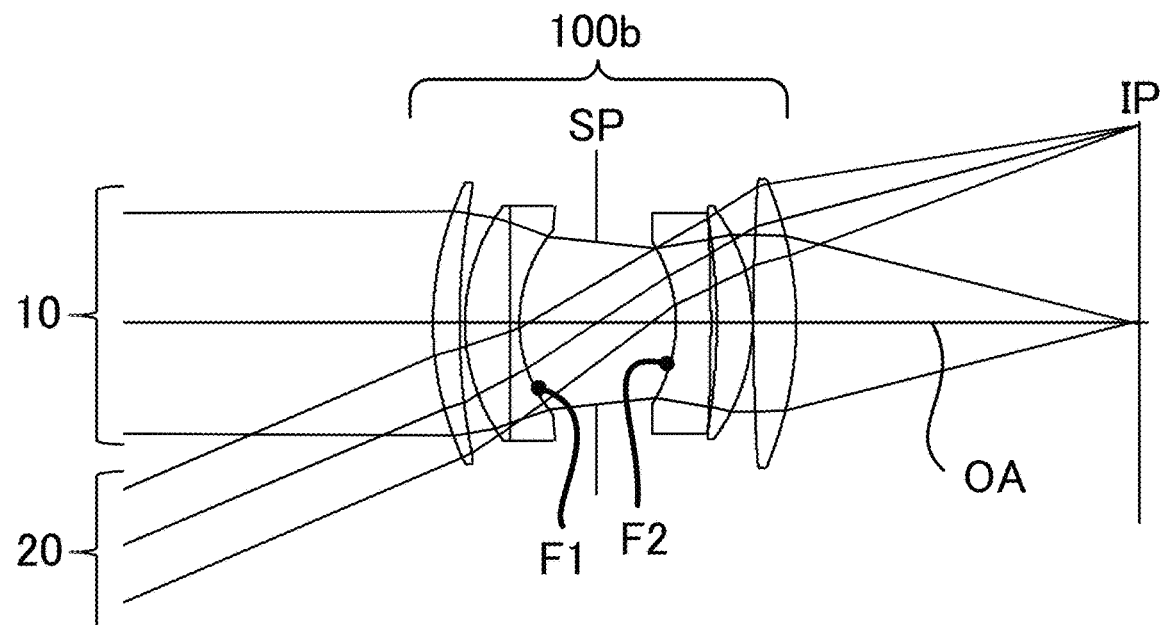
FIG. 7 is a sectional view of an image pickup optical system according to a second embodiment.
Figure 8:
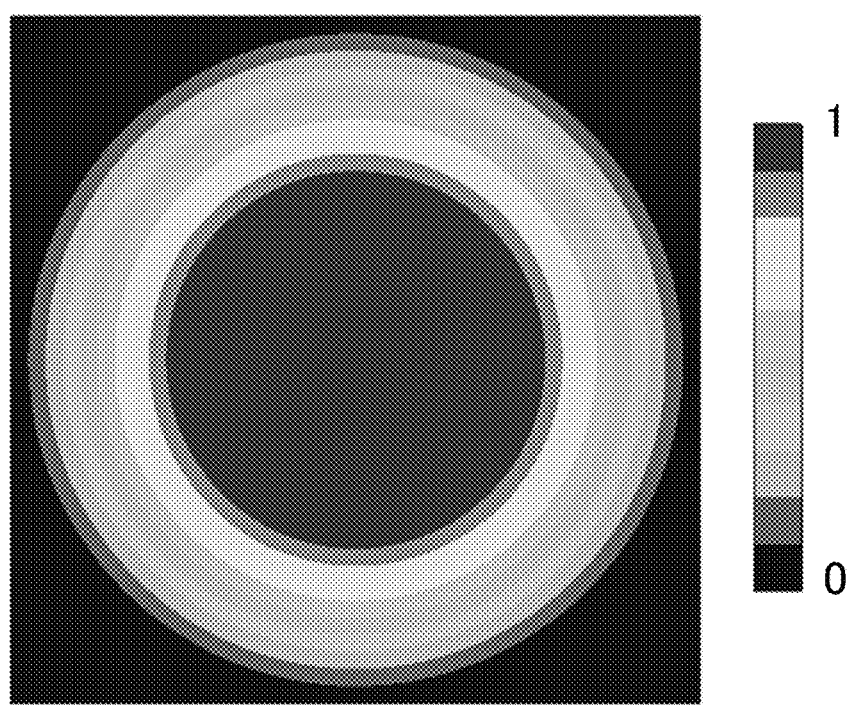
FIG. 8 is a view illustrating a transmittance distribution of a transmittance distribution filter according to the second embodiment.
Figure 9A:
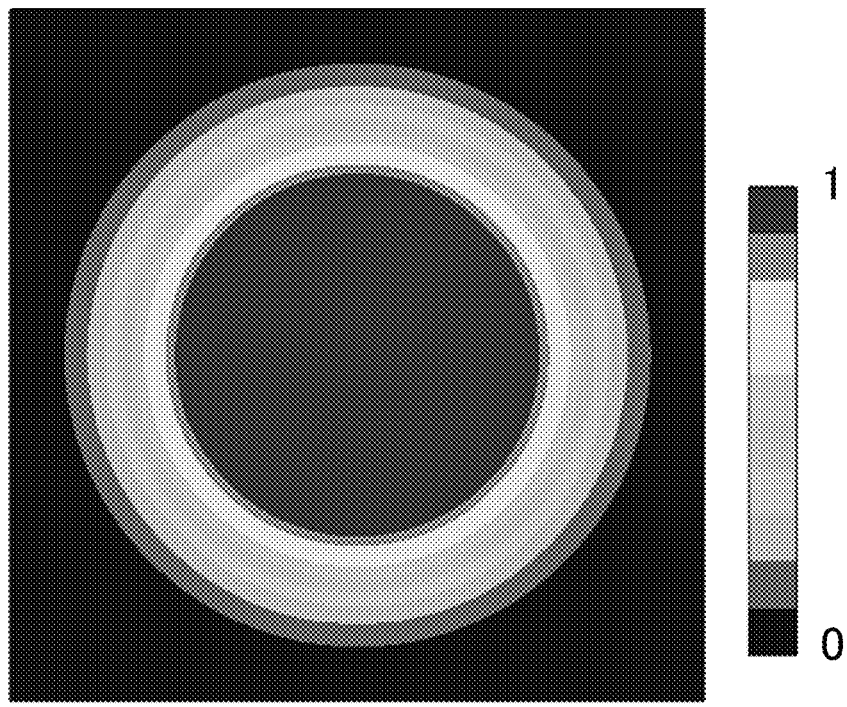
FIGS. 9A and 9B are views illustrating pupil transmittance distributions of an on-axis light beam and an off-axis light beam according to the second embodiment.
Figure 9B:
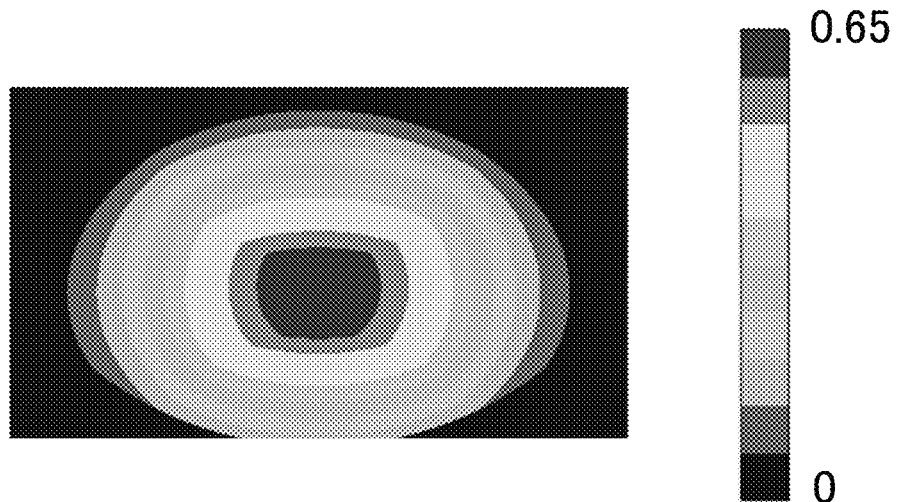

Referring now to FIGS. 7 to 9B, a description will be given of an image pickup optical system according to a second embodiment of the present invention. FIG. 7 is a sectional view of an image pickup optical system 100b according to this embodiment. FIG. 8 is a view illustrating the transmittance distributions of the transmittance distribution filters F1 and F2. FIGS. 9A and 9B are views illustrating the pupil transmittance distributions provided to the on-axis light beam 10 and the off-axis light beam 20 by a combination of the transmittance distribution filters F1 and F2. The image pickup optical system 100b according to this embodiment is different from the image pickup optical system 100a according to the first embodiment described with reference to FIG. 3 in that the transmittance distributions of the transmittance distribution filters F1 and F2 are different. Other configurations of the image pickup optical system 100b are similar to those of the image pickup optical system 100a. The transmittance distribution filters F1 and F2 are arranged on the fifth and seventh surfaces similar to the image pickup optical system 100a. As understood from FIGS. 9A and 9B, a pupil transmittance distribution is highly symmetrical not only for the on-axis light beam 10 but also for the off-axis light beam 20 even when the transmittance distribution filters F1 and F2 are arranged apart from the aperture stop SP.

Third Embodiment

Figure 10:
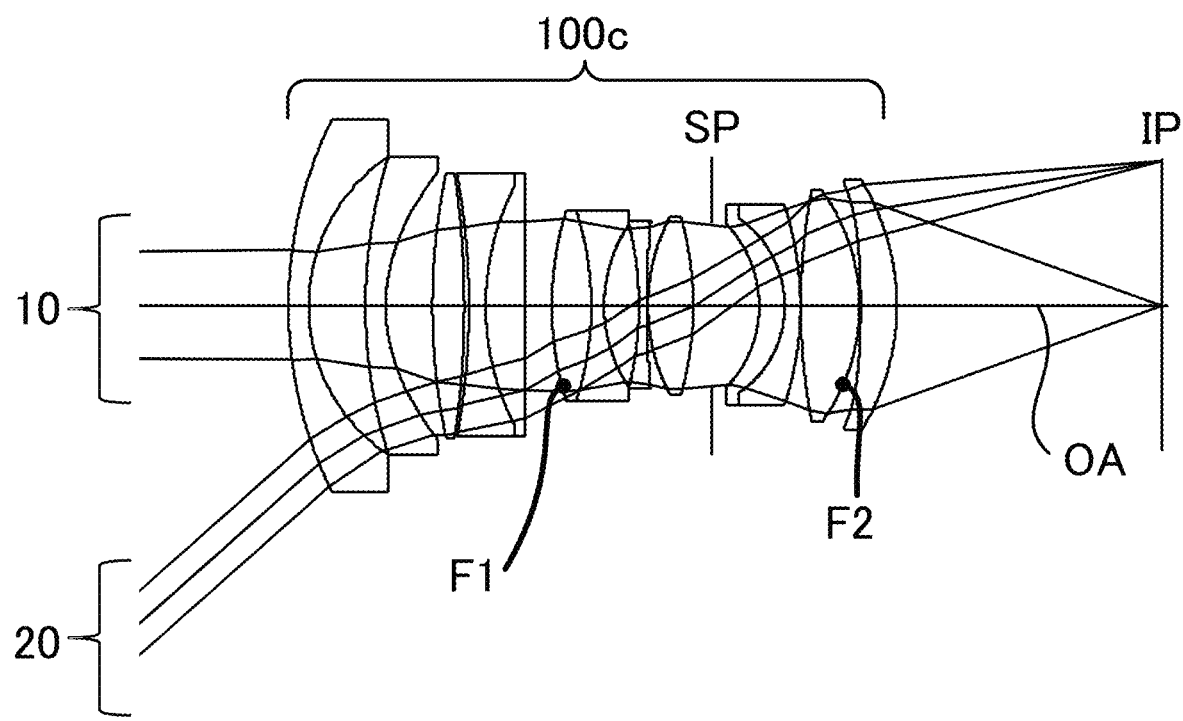
FIG. 10 is a sectional view of an image pickup optical system according to a third embodiment.
Figure 11:
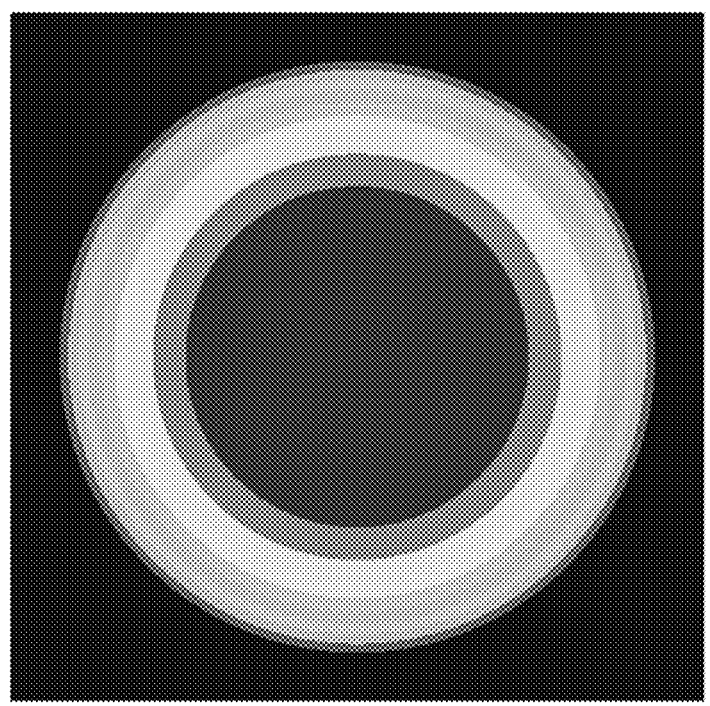
FIG. 11 is a view illustrating a transmittance distribution of a transmittance distribution filter according to the third embodiment.
Figure 11:
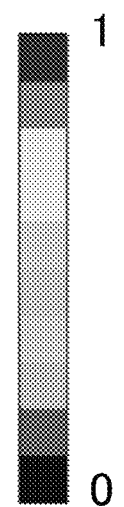
Figure 12A:
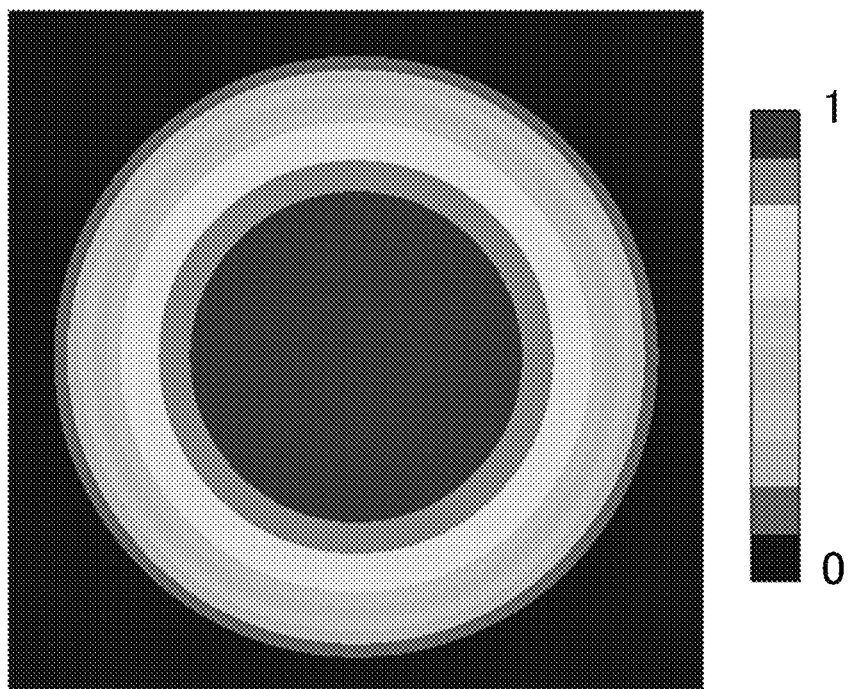
FIGS. 12A and 12B are views illustrating pupil transmittance distributions of an on-axis light beam and an off-axis light beam according to the third embodiment.
Figure 12B:
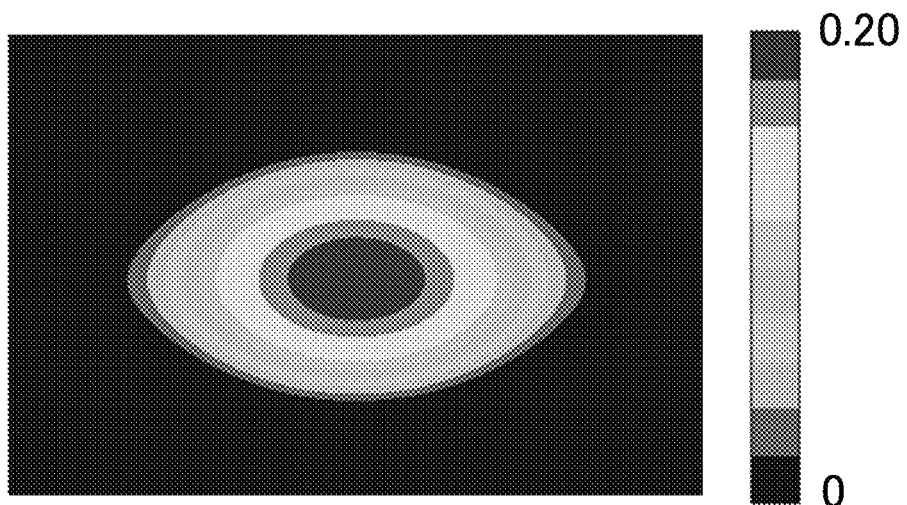

Referring now to FIGS. 10 to 12B, a description will be given of an image pickup optical system according to a third embodiment of the present invention. FIG. 10 is a sectional view of an image pickup optical system 100c according to this embodiment. FIG. 11 is a view illustrating the transmittance distributions of the transmittance distribution filters F1 and F2. FIGS. 12A and 12B are views illustrating the pupil transmittance distributions provided to the on-axis light beam 10 and the off-axis light beam 20 by a combination of the transmittance distribution filters F1 and F2.

In the image pickup optical system 100c, the transmittance distribution F1 is disposed on the tenth surface and the transmittance distribution F2 is disposed on the twenty-second surface. The transmittance distribution filters F1 and F2 provide pupil transmittance distributions to the light beams of all angles of view from the on-axis light beam 10 to the most off-axis light beam 20, and can improve a blurred image. As understood from FIGS. 12A and 12B, a pupil transmittance distribution is highly symmetrical not only for the on-axis light beam 10 but also for the most off-axis light beam 20 even when the transmittance distribution filters F1 and F2 are arranged apart from the aperture stop SP.

Fourth Embodiment

Figure 13:
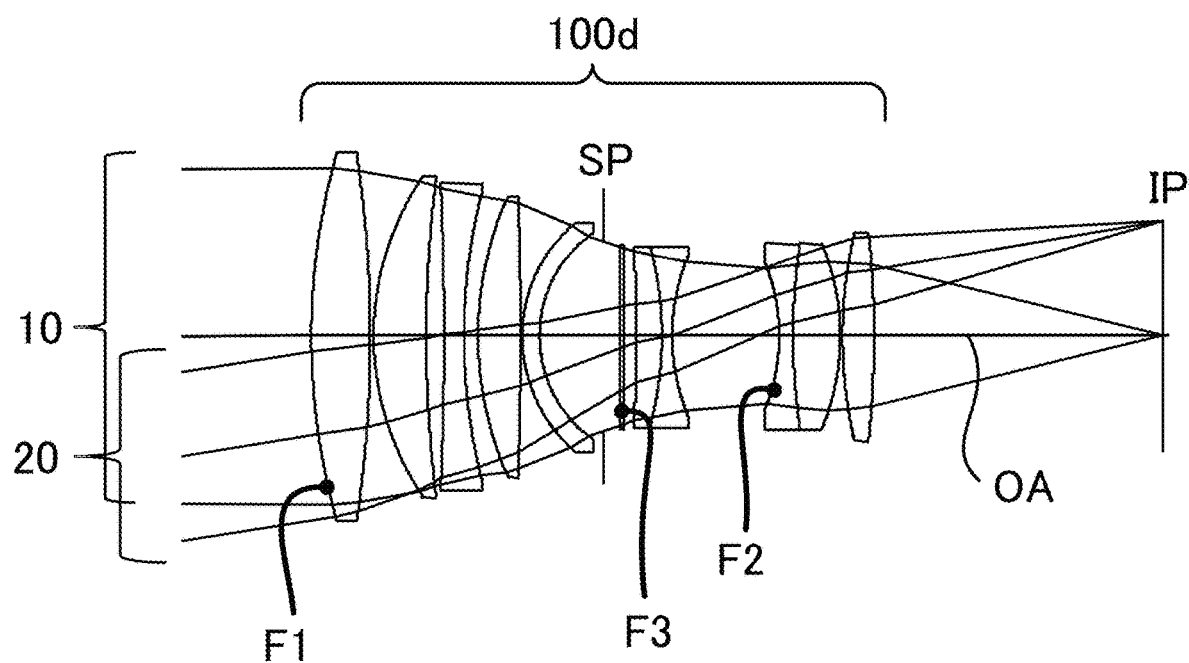
FIG. 13 is a sectional view of an image pickup optical system according to a fourth embodiment.

Referring now to FIGS. 13 to 15B, a description will be given of an image pickup optical system according to a fourth embodiment of the present invention. FIG. 13 is a sectional view of an image pickup optical system 100d according to this embodiment. The image pickup optical apparatus 100d includes three transmittance distribution filters F1, F2, and F3. In the image pickup optical system 100d, a transmittance distribution filter F1 (first apodization filter) is disposed on a first surface (lens surface closest to the object). A transmittance distribution filter F2 (second apodization filter) is disposed on a seventeenth surface. A transmittance distribution filter F3 (third apodization filter) is disposed on a thirteenth surface between the aperture stop SP and the lens surface closest to the aperture stop SP on the image plane IP side of the aperture stop SP.

While the transmittance distribution filter F3 forms a transmittance distribution on the thirteenth surface in this embodiment, an ND filter having a light absorption amount distribution may be used, as described above. The transmittance distribution filters F1, F2, and F3 provide pupil transmittance distributions to the light beams of all angles of view from the on-axis light beam 10 to the off-axis light beam 20, and can improve a blurred image.

Figure 14A:
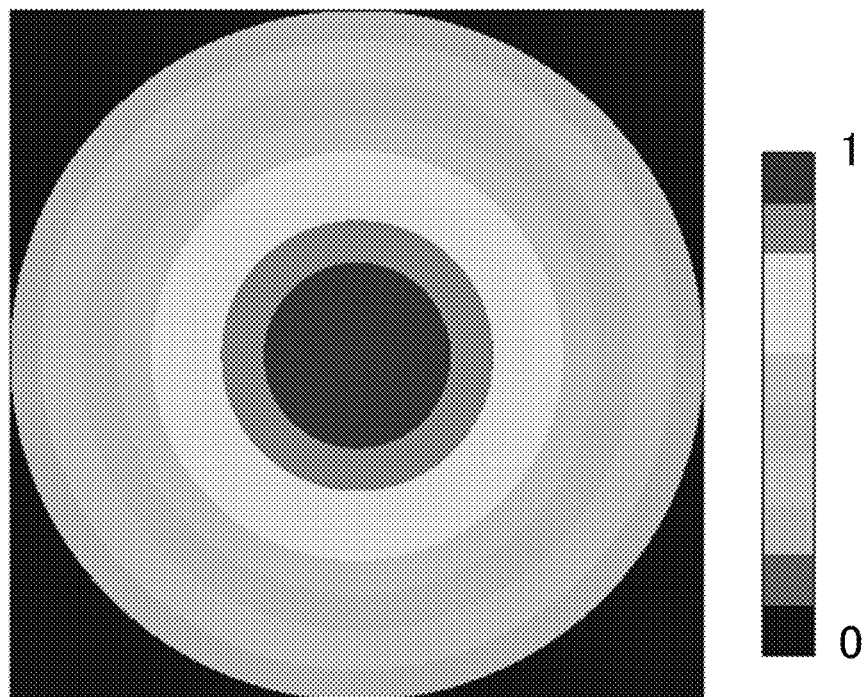
FIGS. 14A and 14B are views illustrating a transmittance distribution of a transmittance distribution filter according to the fourth embodiment.
Figure 14B:
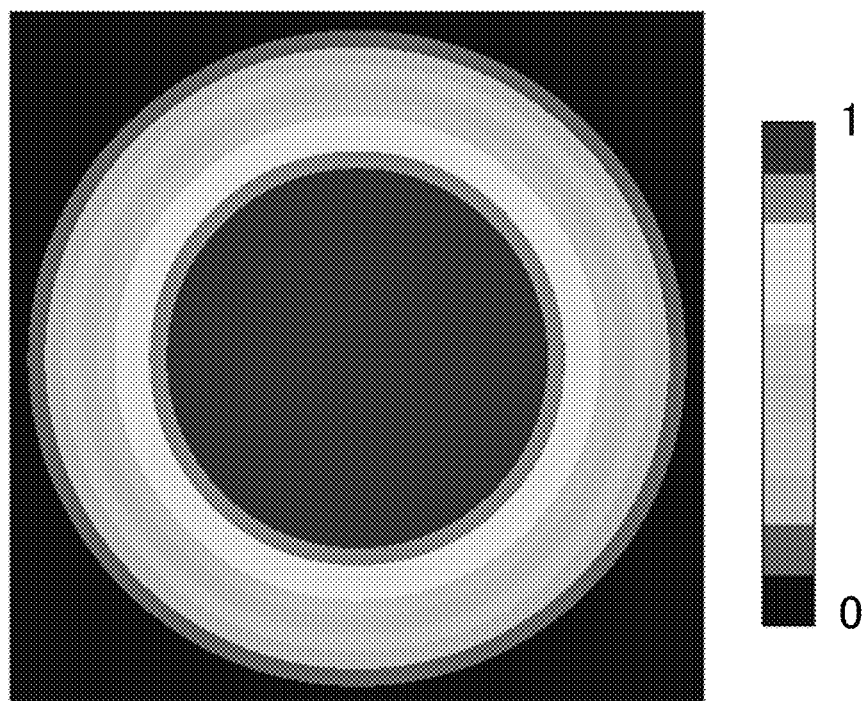
Figure 15A:
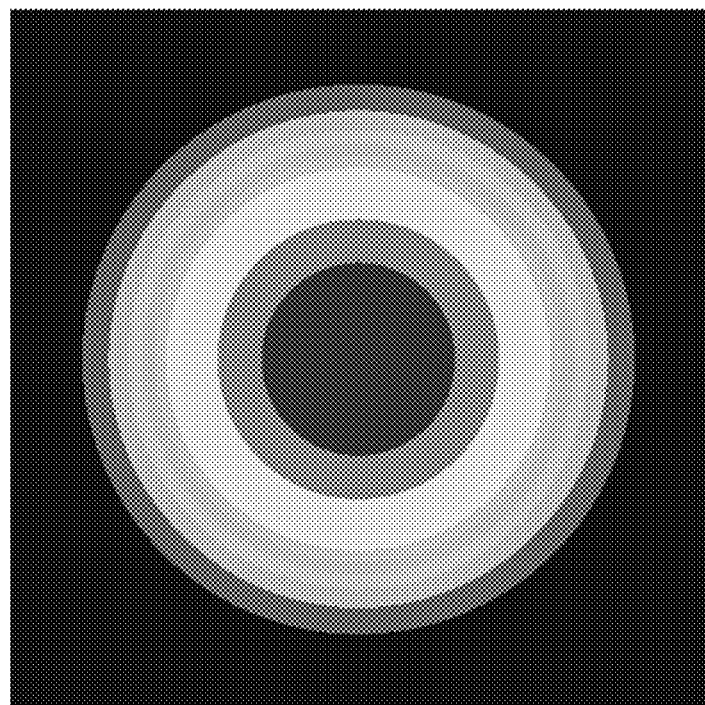
FIGS. 15A and 15B are views illustrating pupil transmittance distributions of an on-axis light beam and an off-axis light beam according to the fourth embodiment.
Figure 15B:
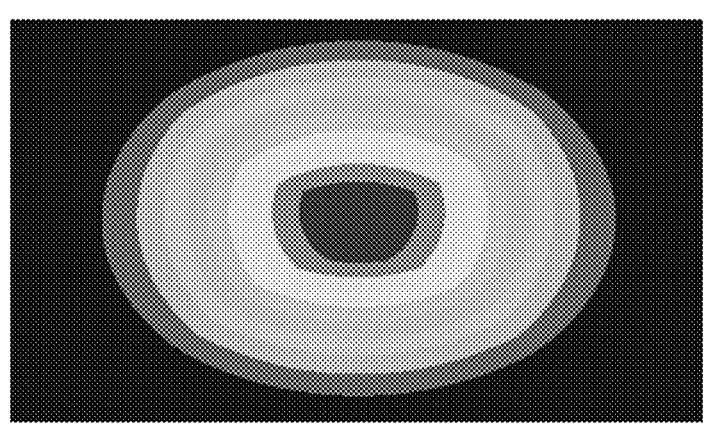

FIG. 14A is a view illustrating the transmittance distributions of the transmittance distribution filters F1 and F2. FIG. 14B is a view illustrating the transmittance distribution of the transmittance distribution filter F3. FIGS. 15A and 15B are views illustrating the pupil transmittance distributions provided to the on-axis light beam 10 and the off-axis light beam 20 by a combination of the transmittance distribution filters F1, F2 and F3. As understood from FIGS. 15A and 15B, a pupil transmittance distribution is highly symmetrical not only for the on-axis light beam 10 but also for the off-axis light beam 20 (most off-axis light beam) even when the transmittance distribution filters F1 and F2 are arranged apart from the aperture stop SP. This embodiment can improve the contour of the blurred image using the transmittance distribution filters F2 and F2, and provide a proper light quantity distribution of the entire blurred image using the transmittance distribution filter F3.

Fifth Embodiment

Figure 16:
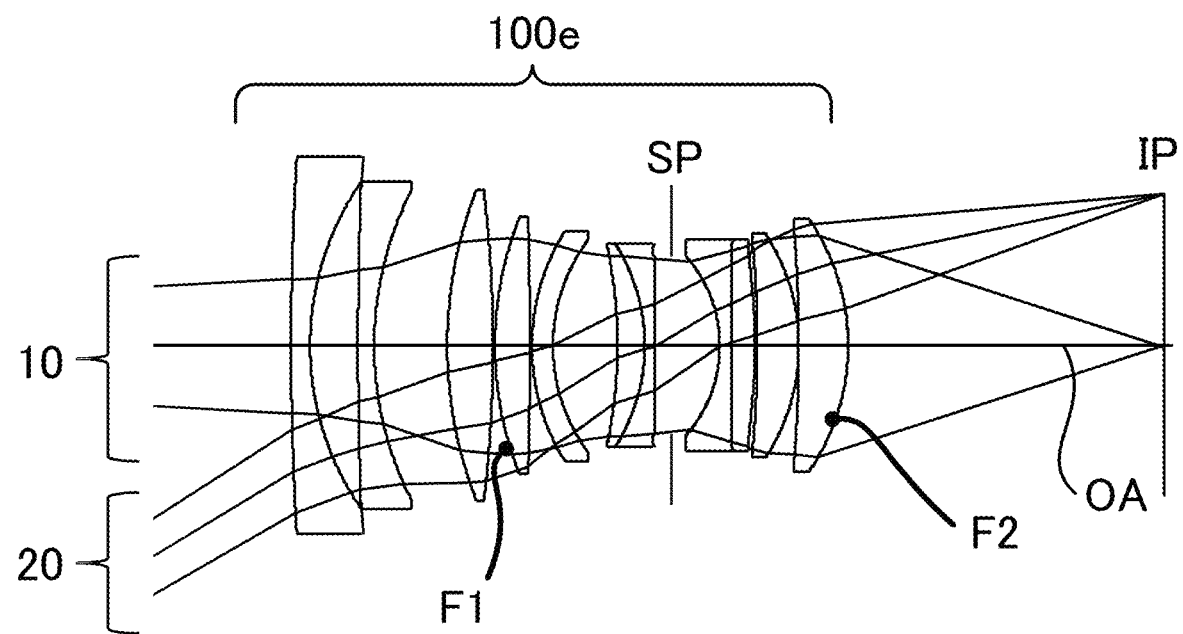
FIG. 16 is a sectional view of an image pickup optical system according to a fifth embodiment.
Figure 17:
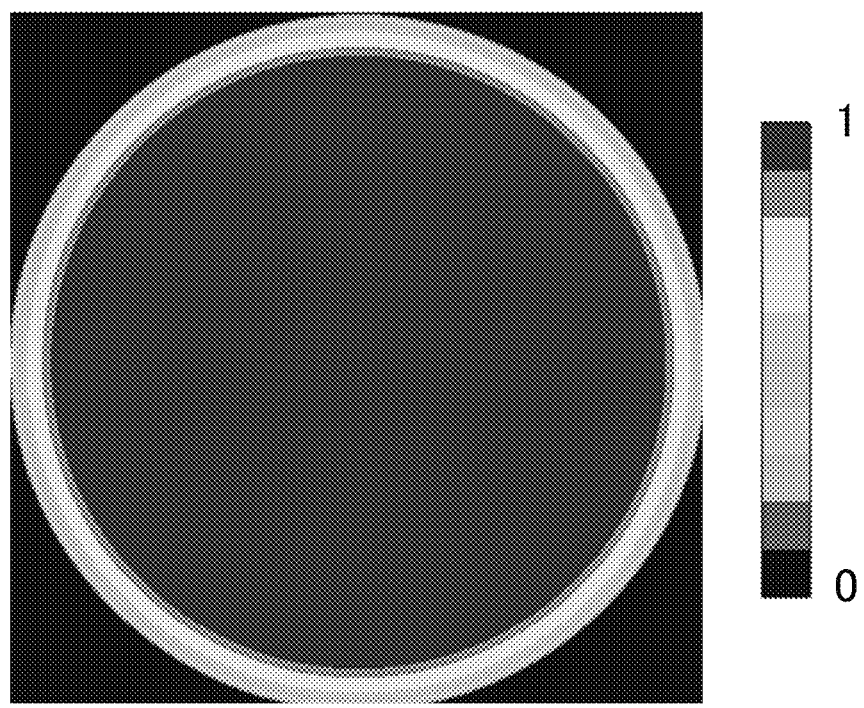
FIG. 17 is a view illustrating a transmittance distribution of a transmittance distribution filter according to the fifth embodiment.
Figure 18A:
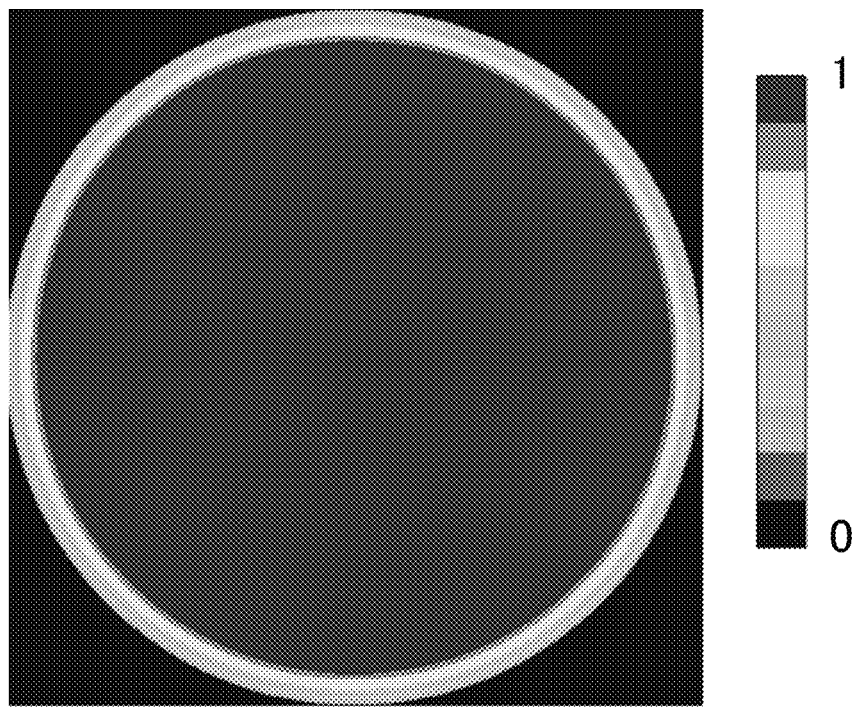
FIGS. 18A and 18B are views illustrating pupil transmittance distributions of an on-axis light beam and an off-axis light beam according to the fifth embodiment.
Figure 18B:
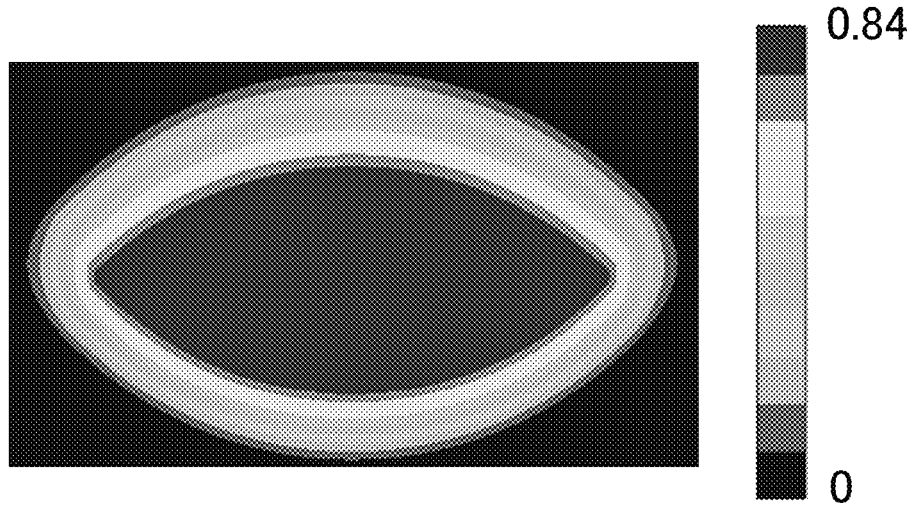

Referring now to FIGS. 16 to 18B, a description will be given of an image pickup optical system according to a fifth embodiment of the present invention. FIG. 16 is a sectional view of an image pickup optical system 100e according to this embodiment. FIG. 17 is a view illustrating the transmittance distributions of the transmittance distribution filters F1 and F2. FIGS. 18A and 18B are views illustrating the pupil transmittance distributions provided to the on-axis light beam 10 and the off-axis light beam 20 by a combination of the transmittance distribution filters F1 and F2.

In the image pickup optical system 100e according to this embodiment, the transmittance distribution F1 is disposed on the seventh surface and the transmittance distribution F2 is disposed on the twenty-first surface (final lens surface or the lens surface closest to the image plane IP). The transmittance distribution filters F1 and F2 provide pupil transmittance distributions to the light beams of all angles of view from the on-axis light beam 10 to the most off-axis light beam 20, and can improve a blurred image. As understood from FIGS. 18A and 18B, a pupil transmittance distribution is highly symmetrical not only for the on-axis light beam 10 but also for the most off-axis light beam 20 even when the transmittance distribution filters F1 and F2 are arranged apart from the aperture stop SP.

Sixth Embodiment

Figure 19:
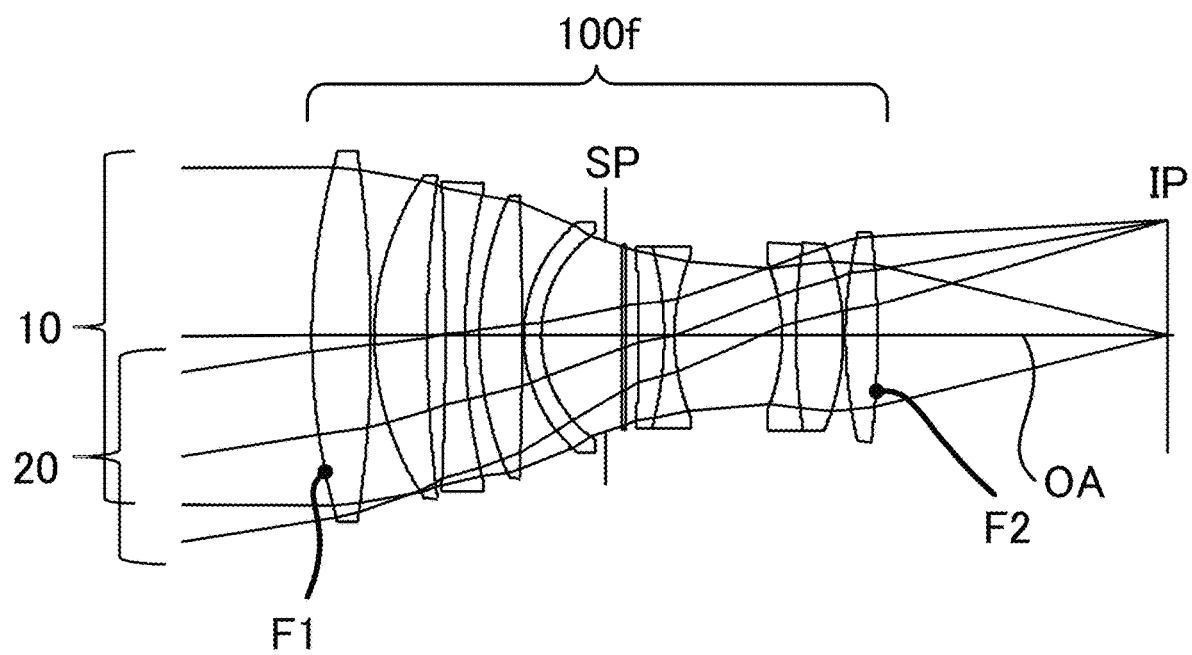
FIG. 19 is a sectional view of an image pickup optical system according to a sixth embodiment.
Figure 20:
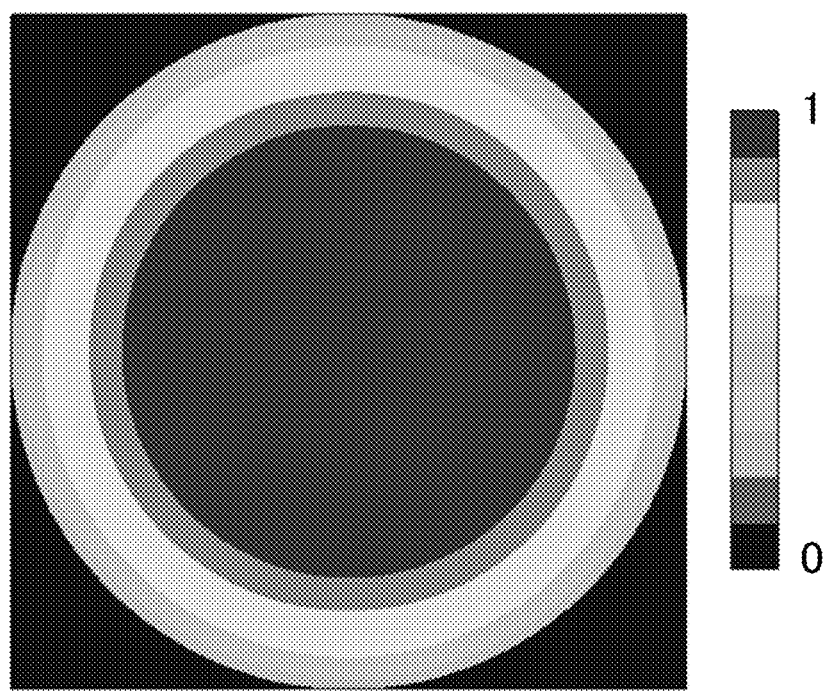
FIG. 20 is a view illustrating a transmittance distribution of a transmittance distribution filter according to the sixth embodiment.
Figure 21A:
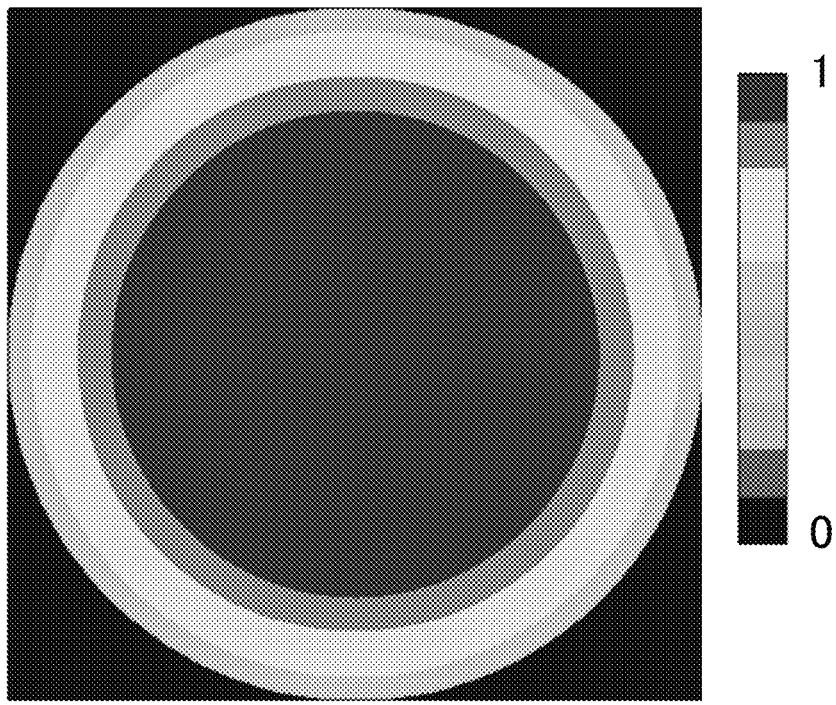
FIGS. 21A and 21B are views illustrating pupil transmittance distributions of an on-axis light beam and an off-axis light beam according to the sixth embodiment.
Figure 21B:
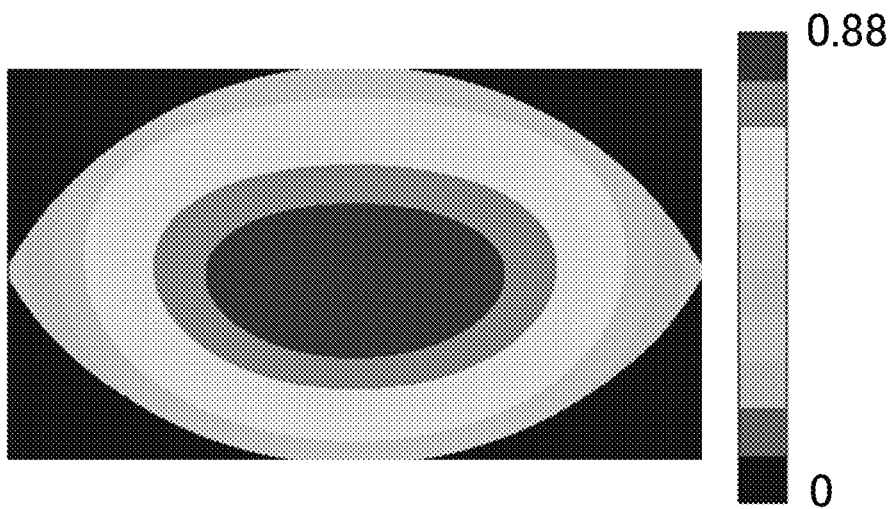

Referring now to FIGS. 19 to 21B, a description will be given of an image pickup optical system according to a sixth embodiment of the present invention. FIG. 19 is a sectional view of an image pickup optical system 100f according to this embodiment. FIG. 20 is a view illustrating the transmittance distributions of the transmittance distribution filters F1 and F2. FIGS. 21A and 21B are views illustrating the pupil transmittance distributions provided to the on-axis light beam 10 and the off-axis light beam 20 by a combination of the transmittance distribution filters F1 and F2.

In the image pickup optical system 100f according to this embodiment, the transmittance distribution F1 is disposed on the first surface (lens surface closest to the object) and the transmittance distribution F2 is disposed on the twenty-first surface (final lens surface or the lens surface closest to the image plane IP). The transmittance distribution filters F1 and F2 provide pupil transmittance distributions to the light beams of all angles of view from the on-axis light beam 10 to the most off-axis light beam 20, and can improve a blurred image. As understood from FIGS. 21A and 21B, a pupil transmittance distribution is highly symmetrical not only for the on-axis light beam 10 but also for the most off-axis light beam 20 even when the transmittance distribution filters F1 and F2 are arranged apart from the aperture stop SP.

Next follows a description of numerical examples 1 to 6 corresponding to the above first to sixth embodiments. In each numerical example, r is a radius of curvature (mm) on an i-th surface from the object side, d is a surface distance (mm) on the optical axis between the i-th surface and the (i+1)-th surface from the object side, nd and vd are refractive index and Abbe number of the i-th object. The focal length f, the F-number Fno, and the angle of view 2ω (degree) have values when the infinity object is focused. BF is back focus. A lens overall length represents a distance from the first surface to the image plane.

An aspheric surface is represented by appending "*" to a surface number. An aspheric shape is represented by the following Expression (10) where X is a displacement amount from a surface vertex in the optical axis direction, h is a height from the optical axis in a direction perpendicular to the optical axis, R is a paraxial radius of curvature, k is a conical constant, A4, A6, A8, A10, and A12 are aspheric coefficients.

$$X = \frac{\left(\frac{h^2}{R}\right)}{1 + \sqrt{1 - (1+k)\left(\frac{h}{R}\right)^2}} + \\ A4 \cdot h^4 + A6 \cdot h^6 + A8 \cdot h^8 + A10 \cdot h^{10} + A12 \cdot h^{12} \tag{10}$$

For example, "e±Z" means $10^{\pm z}$.

Numerical Example 1

Unit: mm

Surface data

| Surface No. | r | d | nd | vd | Effective diameter |
|---|---|---|---|---|---|
| 1 | 35.778 | 2.93 | 1.80100 | 35.0 | 29.78 |
| 2 | 80.155 | 0.49 | | | 28.89 |
| 3 | 22.367 | 5.02 | 1.69680 | 55.5 | 24.75 |
| 4 | ∞ | 1.01 | 1.62588 | 35.7 | 22.98 |
| 5 | 15.375 | 8.35 | | | 19.20 |
| 6 (diaphragm) | ∞ | 8.91 | | | 17.99 |
| 7 | −16.157 | 3.86 | 1.71736 | 29.5 | 16.42 |
| 8 | −252.032 | 0.53 | | | 23.30 |
| 9 | −85.452 | 3.95 | 1.77250 | 49.6 | 23.31 |
| 10 | −22.034 | 0.10 | | | 24.59 |
| 11 | 190.588 | 4.69 | 1.77250 | 49.6 | 30.11 |
| 12 | −40.055 | 36.00 | | | 30.67 |
| Image plane | ∞ | | | | |

Various data

| | |
|---|---|
| Focal length | 50.00 |
| Fno | 2.00 |
| Angle of view | 23.40 |
| Image height | 21.64 |
| Lens overall length | 75.84 |
| BF | 36.00 |
| Entrance pupil position | 21.21 |
| Exit pupil position | −37.27 |
| Front principal position (FPP) | 37.09 |
| Back principal position (BPP) | −14.00 |

Single lens data

| Lens | Starting plane | Focal length |
|---|---|---|
| 1 | 1 | 78.37 |
| 2 | 3 | 32.10 |
| 3 | 4 | −24.57 |
| 4 | 7 | −24.23 |
| 5 | 9 | 37.42 |
| 6 | 11 | 43.23 |

Numerical Example 2

Unit: mm

Surface data

| Surface No. | r | d | nd | vd | Effective diameter |
|---|---|---|---|---|---|
| 1 | 35.778 | 2.93 | 1.80100 | 35.0 | 29.78 |
| 2 | 80.155 | 0.49 | | | 28.89 |
| 3 | 22.367 | 5.02 | 1.69680 | 55.5 | 24.75 |
| 4 | ∞ | 1.01 | 1.62588 | 35.7 | 22.98 |
| 5 | 15.375 | 8.35 | | | 19.20 |
| 6 (diaphragm) | ∞ | 8.91 | | | 17.99 |
| 7 | −16.157 | 3.86 | 1.71736 | 29.5 | 16.42 |
| 8 | −252.032 | 0.53 | | | 23.30 |
| 9 | −85.452 | 3.95 | 1.77250 | 49.6 | 23.31 |
| 10 | −22.034 | 0.10 | | | 24.59 |
| 11 | 190.588 | 4.69 | 1.77250 | 49.6 | 30.11 |
| 12 | −40.055 | 36.00 | | | 30.67 |
| Image plane | ∞ | | | | |

Various data

| | |
|---|---|
| Focal length | 50.00 |
| Fno | 2.00 |
| Angle of view | 23.40 |
| Image height | 21.64 |
| Lens overall length | 75.84 |
| BF | 36.00 |
| Entrance pupil position | 21.21 |
| Exit pupil position | −37.27 |
| Front principal position (FPP) | 37.09 |
| Back principal position (BPP) | −14.00 |

Single lens data

| Lens | Starting plane | Focal length |
|---|---|---|
| 1 | 1 | 78.37 |
| 2 | 3 | 32.10 |
| 3 | 4 | −24.57 |
| 4 | 7 | −24.23 |
| 5 | 9 | 37.42 |
| 6 | 11 | 43.23 |

Numerical Example 3

Unit: mm

Surface data

| Surface No. | r | d | nd | vd | Effective diameter |
|---|---|---|---|---|---|
| 1 | 61.880 | 2.99 | 1.83481 | 42.7 | 54.05 |
| 2 | 27.026 | 8.34 | | | 43.43 |
| 3 | 71.747 | 3.00 | 1.58313 | 59.4 | 43.00 |
| 4* | 25.706 | 6.93 | | | 38.64 |
| 5 | 92.706 | 4.95 | 1.88300 | 40.8 | 38.40 |
| 6 | −127.713 | 0.70 | | | 37.98 |
| 7 | −97.467 | 2.50 | 1.49700 | 81.5 | 37.74 |
| 8 | 39.023 | 5.83 | 1.83481 | 42.7 | 34.40 |
| 9 | −1070.546 | 3.79 | | | 33.54 |
| 10 | 46.333 | 5.98 | 1.83481 | 42.7 | 27.33 |
| 11 | −47.248 | 1.90 | 1.54814 | 45.8 | 25.69 |
| 12 | 21.482 | 5.07 | | | 23.10 |
| 13 | −53.687 | 1.40 | 1.65412 | 39.7 | 23.15 |
| 14 | 197.561 | 0.15 | | | 23.88 |
| 15 | 29.239 | 6.73 | 1.43387 | 95.1 | 25.17 |
| 16 | −44.333 | 2.59 | | | 25.22 |
| 17 (diaphragm) | ∞ | 7.21 | | | 24.21 |
| 18 | −17.904 | 3.78 | 1.60311 | 60.6 | 23.58 |
| 19 | −15.383 | 2.15 | 1.80518 | 25.4 | 24.59 |
| 20 | −48.206 | 0.25 | | | 28.74 |
| 21 | 97.922 | 8.54 | 1.61800 | 63.3 | 31.70 |
| 22 | −29.308 | 0.25 | | | 33.27 |
| 23* | −162.434 | 5.28 | 1.80400 | 46.6 | 34.68 |
| 24 | −36.488 | 38.80 | | | 36.15 |
| Image plane | ∞ | | | | |

Aspheric surface data

Fourth surface

K = 0.00000e+000  A4 = −5.57660e−006  A6 = −9.40593e−009
A8 = 5.84881e−012  A10 = −3.17028e−014

Twenty-third surface

K = 0.00000e+000  A4 = −1.09975e−005  A6 = −1.48146e−009
A8 = −9.36205e−012  A10 = −5.31145e−015

| Unit: mm |  |
|---|---|
| Various data | |
| Focal length | 24.55 |
| Fno | 1.45 |
| Angle of view | 41.39 |
| Image height | 21.64 |
| Lens overall length | 129.11 |
| BF | 38.80 |
| Entrance pupil position | 29.97 |
| Exit pupil position | −56.16 |
| Front principal position (FPP) | 48.18 |
| Back principal position (BPP) | 14.25 |

| Single lens data | | |
|---|---|---|
| Lens | Starting plane | Focal length |
| 1 | 1 | −59.81 |
| 2 | 3 | −70.39 |
| 3 | 5 | 61.48 |
| 4 | 7 | −55.73 |
| 5 | 8 | 45.21 |
| 6 | 10 | 28.86 |
| 7 | 11 | −26.68 |
| 8 | 13 | −64.40 |
| 9 | 15 | 41.76 |
| 10 | 18 | 115.85 |
| 11 | 19 | −28.90 |
| 12 | 21 | 37.46 |
| 13 | 23 | 57.46 |

Numerical Example 4

| Unit: mm | | | | |
|---|---|---|---|---|
| Surface data | | | | |
| Surface No. | r | d | nd | vd | Effective diameter |
|---|---|---|---|---|---|
| 1 | 131.189 | 10.84 | 1.48749 | 70.2 | 67.56 |
| 2 | −264.579 | 0.90 | | | 65.84 |
| 3 | 53.910 | 9.80 | 1.49700 | 81.5 | 58.70 |
| 4 | 260.718 | 3.20 | | | 56.95 |
| 5 | −623.694 | 3.80 | 1.83400 | 37.2 | 56.04 |
| 6 | 105.942 | 2.53 | | | 52.84 |
| 7 | 63.907 | 8.04 | 1.49700 | 81.5 | 51.35 |
| 8 | −609.143 | 0.20 | | | 50.27 |
| 9 | 27.722 | 3.23 | 1.71736 | 29.5 | 41.72 |
| 10 | 23.809 | 12.30 | | | 37.67 |
| 11 | ∞ | 3.00 | | | 35.48 |
| (diaphragm) | | | | | |
| 12 | ∞ | 0.70 | 1.48749 | 70.2 | 33.33 |
| 13 | ∞ | 0.50 | | | 33.00 |
| 14 | −1002.290 | 5.00 | 1.84666 | 23.9 | 32.66 |
| 15 | −65.695 | 1.78 | 1.72000 | 50.2 | 31.52 |
| 16 | 39.690 | 21.66 | | | 28.82 |
| 17 | −34.937 | 2.72 | 1.74077 | 27.8 | 25.91 |
| 18 | 130.139 | 8.68 | 1.77250 | 49.6 | 30.42 |
| 19 | −43.302 | 0.50 | | | 33.58 |
| 20 | 97.410 | 5.67 | 1.83400 | 37.2 | 37.12 |
| 21 | −205.341 | 53.99 | | | 37.55 |
| Image plane | ∞ | | | | |

| Various data | |
|---|---|
| Focal length | 130.98 |
| Fno | 2.06 |
| Angle of view | 9.38 |
| Image height | 21.64 |
| Lens overall length | 159.05 |
| BF | 53.99 |
| Entrance pupil position | 74.80 |
| Exit pupil position | −102.26 |
| Front principal position (FPP) | 95.99 |
| Back principal position (BPP) | −76.99 |

| Single lens data | | |
|---|---|---|
| Lens | Starting plane | Focal length |
| 1 | 1 | 181.54 |
| 2 | 3 | 134.63 |
| 3 | 5 | −108.33 |
| 4 | 7 | 116.84 |
| 5 | 9 | −358.95 |
| 6 | 12 | 0.00 |
| 7 | 14 | 82.83 |
| 8 | 15 | −34.12 |
| 9 | 17 | −36.92 |
| 10 | 18 | 43.00 |
| 11 | 20 | 79.90 |

Numerical Example 5

| Unit: mm | | | | | |
|---|---|---|---|---|---|
| Surface data | | | | | |
| Surface No. | r | d | nd | vd | Effective diameter |
| 1 | 400.000 | 2.80 | 1.58313 | 59.4 | 52.58 |
| 2 | 40.544 | 6.91 | | | 45.50 |
| 3 | 606.181 | 2.30 | 1.58313 | 59.4 | 45.32 |
| 4 | 50.282 | 10.31 | | | 43.04 |
| 5 | 61.687 | 6.50 | 1.71300 | 53.9 | 43.03 |
| 6 | −188.040 | 5.20 | | | 42.59 |
| 7 | 47.477 | 5.06 | 1.71300 | 53.9 | 35.38 |
| 8 | −490.980 | 0.20 | | | 34.36 |
| 9 | 31.299 | 3.00 | 1.51633 | 64.1 | 31.66 |
| 10 | 25.382 | 9.27 | | | 29.20 |
| 11 | −72.820 | 3.77 | 1.83481 | 42.7 | 27.77 |
| 12 | −27.213 | 1.50 | 1.63980 | 34.5 | 27.70 |
| 13 | −1242.161 | 3.70 | | | 26.64 |
| 14 | ∞ | 7.07 | | | 25.33 |
| (diaphragm) | | | | | |
| 15 | −18.961 | 1.60 | 1.80518 | 25.4 | 24.41 |
| 16 | 759.560 | 3.30 | 1.83481 | 42.7 | 27.71 |
| 17* | −65.346 | 0.20 | | | 28.81 |
| 18 | −172.700 | 5.94 | 1.77250 | 49.6 | 29.37 |
| 19 | −30.321 | 0.20 | | | 30.66 |
| 20 | −160.598 | 6.81 | 1.77250 | 49.6 | 33.22 |
| 21 | −32.418 | 38.65 | | | 34.86 |
| Image plane | ∞ | | | | |

| Aspheric surface | |
|---|---|
| Seventeenth surface | |

K = 2.39046e+000  A 4 = 1.36838e−005  A 6 = 3.28097e−010
A 8 = −1.14450e−011

| Various data | |
|---|---|
| Focal length | 34.30 |
| Fno | 1.45 |
| Angle of view | 32.25 |
| Image height | 21.64 |
| Lens overall length | 124.29 |
| BF | 38.65 |
| Entrance pupil position | 35.68 |
| Exit pupil position | −39.73 |
| Front principal position (FPP) | 54.97 |
| Back principal position (BPP) | 4.36 |

-continued

Unit: mm

Single lens data

| Lens | Starting plane | Focal length |
|---|---|---|
| 1 | 1 | −77.59 |
| 2 | 3 | −94.17 |
| 3 | 5 | 65.86 |
| 4 | 7 | 60.96 |
| 5 | 9 | −314.29 |
| 6 | 11 | 50.16 |
| 7 | 12 | −43.51 |
| 8 | 15 | −22.95 |
| 9 | 16 | 72.21 |
| 10 | 18 | 46.76 |
| 11 | 20 | 51.39 |

Numerical Example 6

Unit: mm

Surface data

| Surface No. | r | d | nd | vd | Effective diameter |
|---|---|---|---|---|---|
| 1 | 131.189 | 10.84 | 1.48749 | 70.2 | 67.56 |
| 2 | −264.579 | 0.90 | | | 65.84 |
| 3 | 53.910 | 9.80 | 1.49700 | 81.5 | 58.70 |
| 4 | 260.718 | 3.20 | | | 56.95 |
| 5 | −623.694 | 3.80 | 1.83400 | 37.2 | 56.04 |
| 6 | 105.942 | 2.53 | | | 52.84 |
| 7 | 63.907 | 8.04 | 1.49700 | 81.5 | 51.35 |
| 8 | −609.143 | 0.20 | | | 50.27 |
| 9 | 27.722 | 3.23 | 1.71736 | 29.5 | 41.72 |
| 10 | 23.809 | 12.30 | | | 37.67 |
| 11 (diaphragm) | ∞ | 3.00 | | | 35.48 |
| 12 | ∞ | 0.70 | 1.48749 | 70.2 | 33.33 |
| 13 | ∞ | 0.50 | | | 33.00 |
| 14 | −1002.290 | 5.00 | 1.84666 | 23.9 | 32.66 |
| 15 | −65.695 | 1.78 | 1.72000 | 50.2 | 31.52 |
| 16 | 39.690 | 21.66 | | | 28.82 |
| 17 | −34.937 | 2.72 | 1.74077 | 27.8 | 25.91 |
| 18 | 130.139 | 8.68 | 1.77250 | 49.6 | 30.42 |
| 19 | −43.302 | 0.50 | | | 33.58 |
| 20 | 97.410 | 5.67 | 1.83400 | 37.2 | 37.12 |
| 21 | −205.341 | 53.99 | | | 37.55 |
| Image plane | ∞ | | | | |

Various data

| Focal length | 130.98 |
|---|---|
| Fno | 2.06 |
| Angle of view | 9.38 |
| Image height | 21.64 |
| Lens overall length | 159.05 |
| BF | 53.99 |
| Entrance pupil position | 74.80 |
| Exit pupil position | −102.26 |
| Front principal position (FPP) | 95.99 |
| Back principal position (BPP) | −76.99 |

Single lens data

| Lens | Starting plane | Focal length |
|---|---|---|
| 1 | 1 | 181.54 |
| 2 | 3 | 134.63 |
| 3 | 5 | −108.33 |
| 4 | 7 | 116.84 |
| 5 | 9 | −358.95 |
| 6 | 12 | 0.00 |
| 7 | 14 | 82.83 |

-continued

Unit: mm

| 8 | 15 | −34.12 |
|---|---|---|
| 9 | 17 | −36.92 |
| 10 | 18 | 43.00 |
| 11 | 20 | 79.90 |

Figure 22:
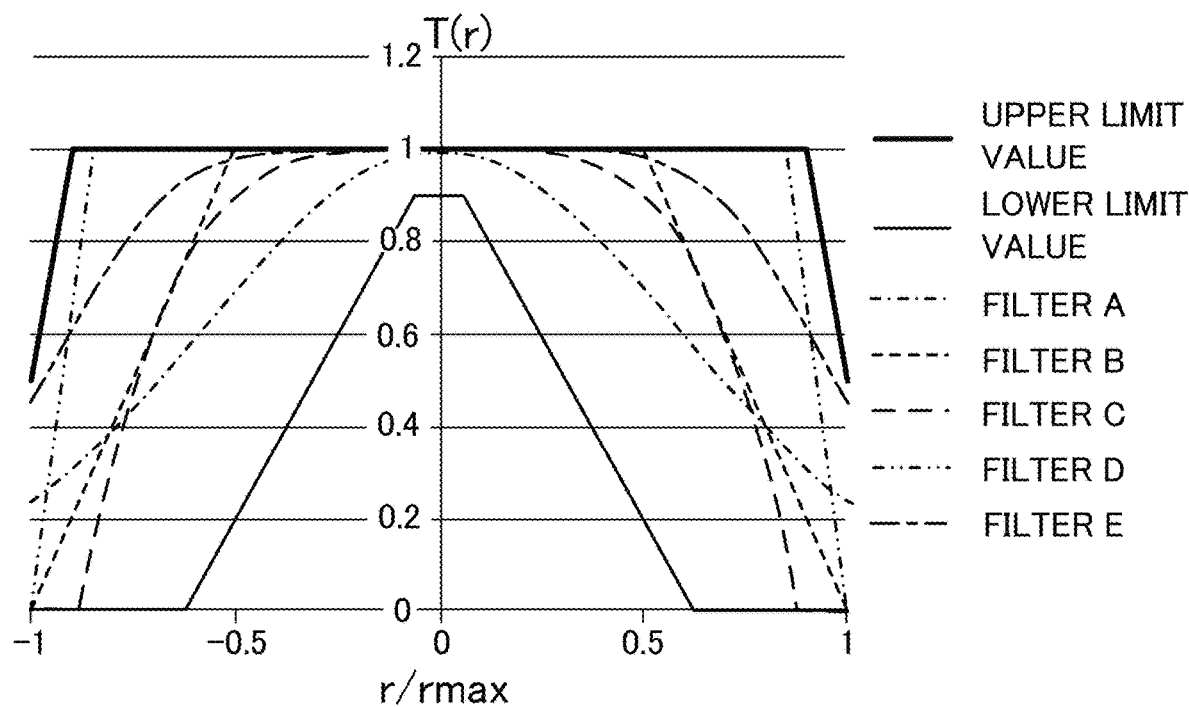
FIG. 22 is a view illustrating a conditional expression (7) according to this embodiment.
Figure 23:
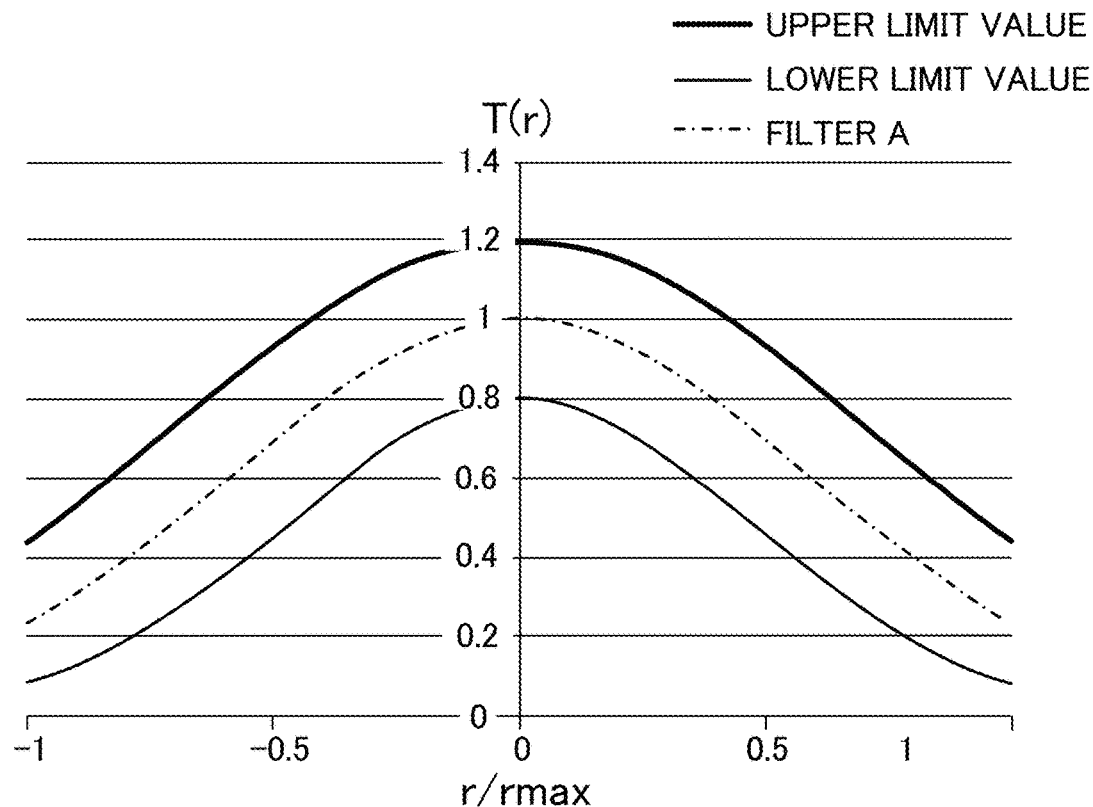
FIG. 23 is a view illustrating a conditional expression (8) for filter A according to this embodiment.
Figure 24:
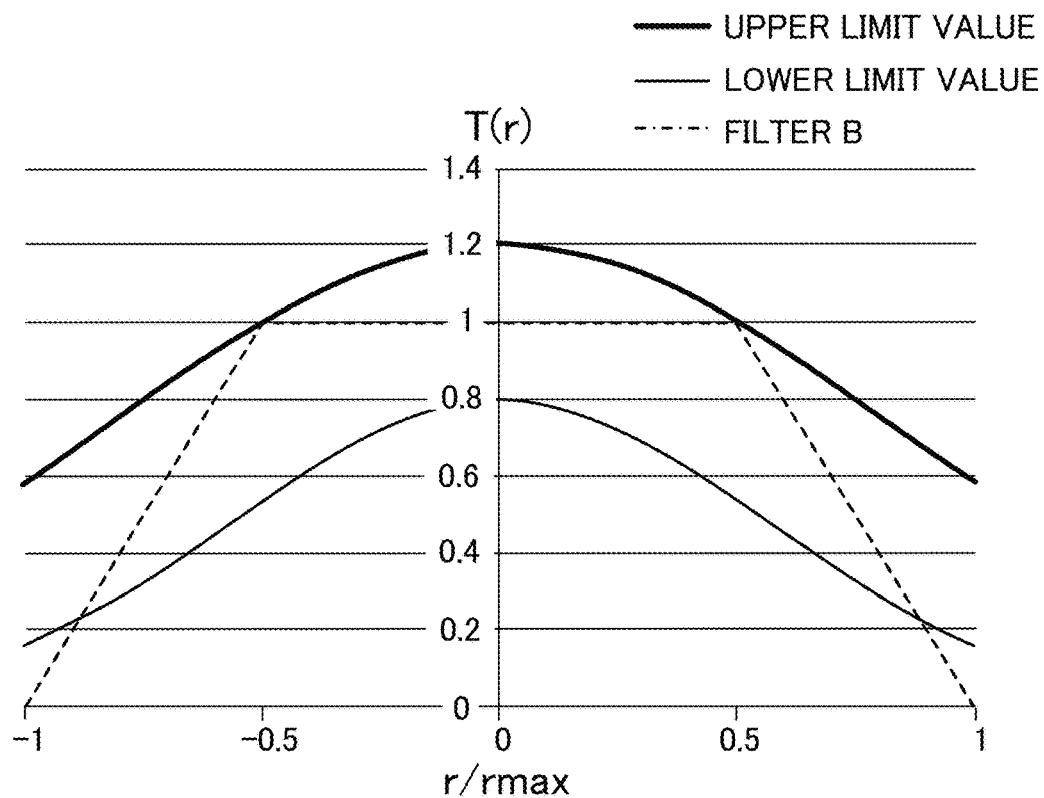
FIG. 24 is a view illustrating the conditional expression (8) for filter B according to this embodiment.
Figure 25:
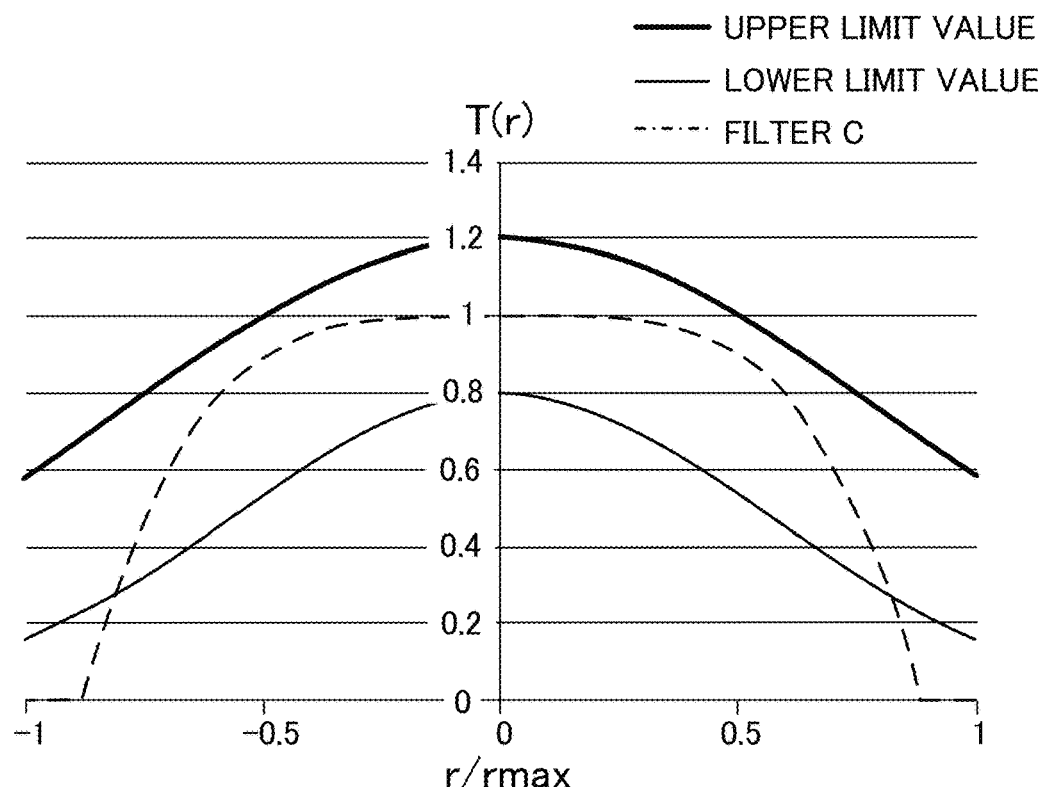
FIG. 25 is a view illustrating the conditional expression (8) for filter C according to this embodiment.
Figure 26:
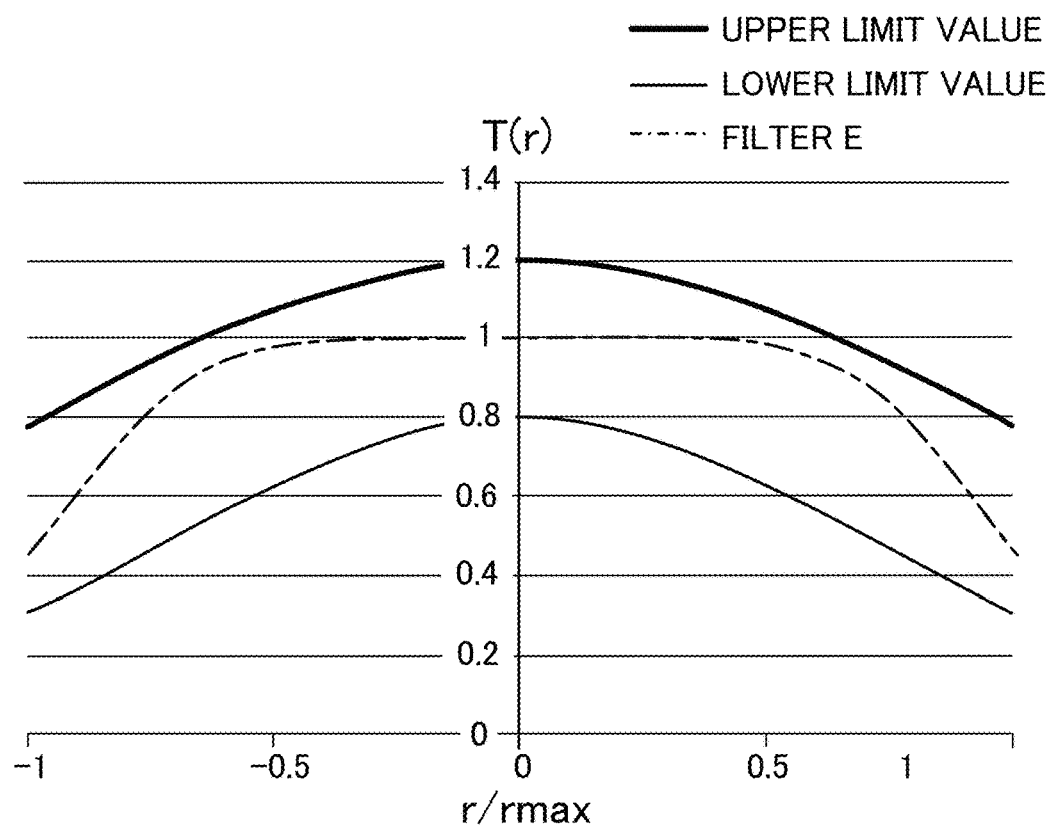
FIG. 26 is a view illustrating the conditional expression (8) for filter E according to this embodiment.

Table 1 summarizes numerical values corresponding to the conditional expressions (2) to (6) and (9) in each numerical example. FIG. 22 illustrates numerical values corresponding to the conditional expression (7). FIGS. 23, 24, 25, and 26 illustrate numerical values corresponding to the conditional expression (8) for each numerical example. In FIGS. 22 to 26, a filter A corresponds to F1 and F2 in the first embodiment and F3 in the fourth embodiment. A filter B corresponds to F1 and F2 in the second embodiment and F1 and F2 in the fourth embodiment. A filter C corresponds to F1 and F2 in the third embodiment. A filter D corresponds to F1 and F2 in the fifth embodiment. A filter E corresponds to F1 and F2 in the sixth embodiment. It is noted that the filter D does not satisfy the conditional expression (8).

TABLE 1

| | | | first embodiment | second embodiment | third embodiment |
|---|---|---|---|---|---|
| Conditional expression | (2) | F1 | 0.24 | 0.00 | 0.00 |
| | | F2 | 0.24 | 0.00 | 0.00 |
| | | F3 | — | — | — |
| | (3) | | — | 0.22 | 0.35 |
| | (4) | F1 | −0.005 | −0.005 | 0.034 |
| | | F2 | 0.032 | 0.032 | −0.009 |
| | | F3 | — | — | — |
| | (5) | | — | 25.0 | 16.9 |
| | (6) | | — | 50.0 | 24.6 |
| | (9) | | — | 0.35 | 0.22 |

| | | | fourth embodiment | fifth embodiment | sixth embodiment |
|---|---|---|---|---|---|
| Conditional expression | (2) | F1 | 0.00 | 0.00 | 0.45 |
| | | F2 | 0.00 | 0.00 | 0.45 |
| | | F3 | 0.24 | — | — |
| | (3) | | 0.55 | 0.41 | 0.66 |
| | (4) | F1 | 0.120 | 0.042 | 0.120 |
| | | F2 | 0.019 | 0.081 | 0.129 |
| | | F3 | −0.163 | — | — |
| | (5) | | 63.6 | 23.7 | 63.6 |
| | (6) | | 131.0 | 34.3 | 131.0 |
| | (9) | | 0.43 | 0.29 | 0.43 |

Figure 27:
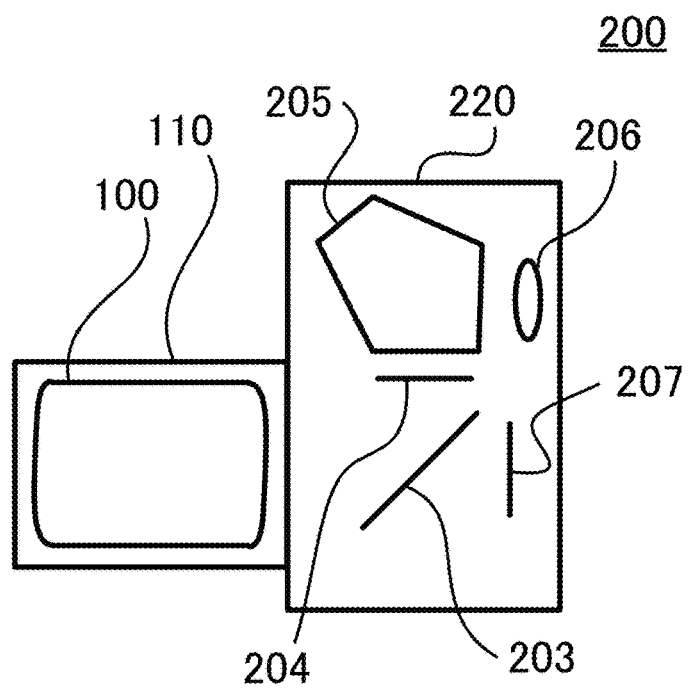
FIG. 27 is a structural view of an image pickup apparatus according to this embodiment.

Referring now to FIG. 27, a description will be given of an image pickup apparatus (camera system) including the image pickup optical system (image pickup lens) according to this embodiment. FIG. 27 is a structural view of an image pickup apparatus 200 (single-lens reflex camera) according to this embodiment.

A lens barrel 110 (interchangeable lens) includes the image pickup optical system 100 as the image pickup lens. The image pickup optical system 100 is one of the image pickup optical systems according to the first to sixth embodiments. The image pickup optical system 100 is held in the lens barrel 110 as a holder.

Reference numeral 220 denotes a camera body (image pickup apparatus body). The camera body 220 includes a quick return mirror 203, a focusing screen 204, a pentadach prism 205, and an eyepiece 206. The quick return mirror 203 reflects up a light beam passing through the image pickup optical system 100. The focusing screen 204 is disposed on an imaging position of the image pickup optical system 100. The pentadach prism 205 converts an inverse image formed on the focusing screen 204 into an erect image. The user can observe the erect image via the eyepiece 206. Reference numeral 207 denotes a photosensitive plane, on which a photosensitive conversion element (image sensor), such as a CCD sensor and a CMOS sensor, and a film for receiving an optical image is located. In image pickup, the quick return mirror 203 retreats from the optical path, and an optical image is formed on the photosensitive plane 207 via the image pickup optical system 100. Thus, the image sensor photoelectrically converts an optical image formed by the image pickup optical system 100 and outputs image data.

This embodiment can provide an optical apparatus with a high optical performance by applying the lens barrel 110 according to this embodiment to the image pickup apparatus 200, such as a single-lens reflex camera. While the lens barrel 110 is an interchangeable lens that can be attached to and detached from the camera body 220, this embodiment is applicable to an image pickup in which the lens barrel 110 is integrated with the camera body 220. The lens barrel 110 is applicable to a non-reflex or mirror-less camera having no quick return mirror.

By applying the image pickup optical system according to each embodiment to the image pickup apparatus, such as a film-based camera, a video camera, a digital still camera, the image pickup apparatus can provide a good defocus image for light beams of all angles of view. Each embodiment can provide an image pickup optical system and an image pickup apparatus, which can obtain a defocus image of light beams of all angles of view even when the image pickup optical system has vignetting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-102380, filed on May 20, 2015, and Japanese Patent Application No. 2016-095927, filed on May 12, 2016, which are hereby incorporated by reference herein in their entirety.

What is claimed is:

1. An image pickup optical system comprising:
an aperture stop;
a first apodization filter disposed on an object side of the aperture stop; and
a second apodization filter disposed on an image plane side of the aperture stop,
wherein each of the first apodization filter and the second apodization filter satisfies the following conditional expression:

$$T(r1) \geq T(r2)$$

where r1 and r2 (r1<r2) are distances from an optical axis in a radial direction orthogonal to the optical axis, T(r1) and T(r2) are transmittances at positions apart from the optical axis by the distances of r1 and r2,
wherein a transmittance of the first apodization filter is smaller in a periphery of the first apodization filter than in a center part of the first apodization filter,
wherein a transmittance of the second apodization filter is smaller in a periphery of the second apodization filter than in a center part of the second apodization filter,
wherein when an aperture size of the aperture stop is maximum, a width of an entire meridional light beam of a maximum angle of view at the aperture stop is narrower than a width of an entire on-axis light beam at the aperture stop, and
wherein when the aperture size of the aperture stop is maximum, at least one of (a) a region where the entire meridional light beam of a maximum angle of view is incident on the first apodization filter or (b) a region where the entire meridional light beam of a maximum angle of view is incident on the second apodization filter includes at least a part of a region where the entire on-axis light beam is incident but does not include a point on the optical axis.

2. The image pickup optical system according to claim 1, wherein the conditional expression is satisfied on one section that passes the optical axis.

3. The image pickup optical system according to claim 1, wherein the conditional expression is satisfied in areas symmetrical with respect to the optical axis.

4. The image pickup optical system according to claim 1, wherein at least one of the first apodization filter and the second apodization filter satisfy the following conditional expression:

$$T1/T0 \leq 0.5$$

where T0 is a maximum transmittance within an effective diameter, and T1 is a minimum transmittance within the effective diameter.

5. The image pickup optical system according to claim 1, wherein the following conditional expression is satisfied, $$e/L > 0.1$$

where e is a distance on the optical axis between the first apodization filter and the second apodization filter, and L is a distance between a surface vertex of a lens surface closest to an object in the image pickup optical system and a paraxial imaging plane.

6. The image pickup optical system according to claim 1, wherein the following conditional expression is satisfied when the aperture size of the aperture stop is maximum, $$-0.2 < (dj - Dj)/L < 0.3 (j=1,2)$$

where Hb is a nodal point between the optical axis and a perpendicular line that passes a nodal point between an uppermost ray of a most off-axis light beam and an uppermost ray of an on-axis light beam, Hf is a nodal point between the optical axis and a perpendicular line that passes a nodal point between a lowermost ray of a most off-axis light beam and a lowermost ray of the on-axis light beam, dj (j=1, 2) is a distance on the optical axis between one of the first apodization filter and the second apodization filter and the aperture stop, and Dj (j=1, 2) is a distance on the optical axis between the aperture stop and one of Hf and Hb closer to the one of the first apodization filter and the second apodization filter.

7. The image pickup optical system according to claim 1, wherein the following conditional expression is satisfied in focusing on infinity, $$10 \text{ mm} \leq f/Fno \leq 75 \text{ mm}$$

where f (mm) is a focal length of the image pickup optical system and Fno is an minimum F-number.

8. The image pickup optical system according to claim 1, wherein the following conditional expression is satisfied, $$10 \text{ mm} \leq f \leq 140 \text{ mm}$$

where f is a focal length of the image pickup optical system.

9. The image pickup optical system according to claim 1, wherein a transmittance difference in a wavelength range from 430 nm to 700 nm at the same position in at least one of the first and second apodization filters may be 20% or smaller.

10. The image pickup optical system according to claim 1, wherein the following conditional expression is satisfied in at least one of the first apodization filter and the second apodization filter, $$\min(0.9, \max(0, -1.6r+1)) \leq T(r/r\max) \leq \min(1, -5r+5.5)$$

where rmax is an effective diameter, and r is a distance from the optical axis in the radius direction,
min(A, B) is a smaller one of A and B, and max(A, B) is a larger one of A and B.

11. The image pickup optical system according to claim 1, wherein the following conditional expression is satisfied in at least one of the first apodization filter and the second apodization filter in a range of r<0.8*rmax, $$0.8*\exp(-(\tfrac{1}{2})*(r/(0.8*r0))2) \leq T(r/r\max) \leq 1.2*\exp(-(\tfrac{1}{2})*(r/(1.2*r0))2)$$

where rmax is an effective diameter, T0 is a maximum transmittance within the effective diameter, and T1 is a minimum transmittance within the effective diameter, and r0*rmax is a diameter with which a transmittance is T0/√e.

12. The image pickup optical system according to claim 1, wherein:
a transmittance of an uppermost ray of a maximum view angle light beam in one of the first apodization filter and the second apodization filter is higher than a transmittance of a lowermost ray when the aperture size of the aperture stop is maximum, and
the transmittance of the lowermost ray of the maximum view angle light beam in the other of the first apodization filter and the second apodization filter is higher than the transmittance of the uppermost ray when the aperture size of the aperture stop is maximum.

13. The image pickup optical system according to claim 12, wherein:
a transmittance of an uppermost ray of the meridional light beam of the maximum angle of view is a maximum transmittance and a transmittance of a lowermost ray of the meridional light beam is a minimum transmittance in one of the first apodization filter and the second apodization filter when the aperture size of the aperture stop is maximum, and
the transmittance of the lowermost ray of the meridional light beam of the maximum angle of view is a maximum transmittance and the transmittance of the uppermost ray of the meridional light beam is a minimum transmittance in the other of the first apodization filter and the second apodization filter when the aperture size of the aperture stop is maximum.

14. The image pickup optical system according to claim 1, wherein the following conditional expression is satisfied when the aperture size of the aperture stop is maximum, $$R \leq 0.5$$

where y is an image height, Ymax is a maximum image height, R is a peripheral light quantity ratio at the image height y that satisfies y=0.9Ymax, the peripheral light quantity ratio being a light quantity ratio of a light quantity of the off-axis light beam to a light quantity of the on-axis light beam,
wherein the peripheral light quantity ratio is calculated when the image pickup optical system does not include the first and second apodization filters.

15. The image pickup optical system according to claim 1, further comprising:
a front unit disposed on the object side of the aperture stop and including the first apodization filter; and
a rear unit disposed on the image plane side of the aperture stop and including the second apodization filter.

16. The image pickup optical system according to claim 1, further comprising a third apodization filter between the first apodization filter and the second apodization filter.

17. An image pickup system comprising:
an image pickup optical system; and
an image sensor configured to photoelectrically convert an optical image formed via the image pickup optical system and to output image data,
wherein the image pickup optical system includes:
an aperture stop;
a first apodization filter disposed on an object side of the aperture stop; and
a second apodization filter disposed on an image plane side of the aperture stop,
wherein each of the first apodization filter and the second apodization filter satisfies the following conditional expression:

$$T(r1) \geq T(r2)$$

where r1 and r2 (r1<r2) are distances from an optical axis in a radial direction orthogonal to the optical axis, T(r1) and T(r2) are transmittances at positions apart from the optical axis by the distances of r1 and r2,
wherein a transmittance of the first apodization filter is smaller in a periphery of the first apodization filter than in a center part of the first apodization filter,
wherein a transmittance of the second apodization filter is smaller in a periphery of the second apodization filter than in a center part of the second apodization filter,
wherein when an aperture size of the aperture stop is maximum, a width of an entire meridional light beam of a maximum angle of view at the aperture stop is narrower than a width of an entire on-axis light beam at the aperture stop, and
wherein when the aperture size of the aperture stop is maximum, at least one of (a) a region where the entire meridional light beam of a maximum angle of view is incident on the first apodization filter or (b) a region where the entire meridional light beam of a maximum angle of view is incident on the second apodization filter includes at least a part of a region where the entire on-axis light beam is incident but does not include a point on the optical axis.

* * * * *